United States Patent
Chang

(10) Patent No.: US 10,856,010 B2
(45) Date of Patent: Dec. 1, 2020

(54) DEVICE AND METHOD FOR CODING VIDEO DATA BASED ON MULTIPLE REFERENCE LINES

(71) Applicant: FG Innovation Company Limited, Tuen Mun (HK)

(72) Inventor: Yao-Jen Chang, Hsinchu (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/122,901

(22) Filed: Sep. 6, 2018

(65) Prior Publication Data

US 2019/0082194 A1 Mar. 14, 2019

Related U.S. Application Data

(60) Provisional application No. 62/556,021, filed on Sep. 8, 2017, provisional application No. 62/587,676, filed on Nov. 17, 2017.

(51) Int. Cl.
| | |
|---|---|
| *H04N 11/02* | (2006.01) |
| *H04N 19/593* | (2014.01) |
| *H04N 19/11* | (2014.01) |
| *H04N 19/182* | (2014.01) |
| *H04N 19/46* | (2014.01) |
| *H04N 19/105* | (2014.01) |
| *H04N 19/176* | (2014.01) |
| *H04N 19/82* | (2014.01) |

(52) U.S. Cl.
CPC ......... *H04N 19/593* (2014.11); *H04N 19/105* (2014.11); *H04N 19/11* (2014.11); *H04N 19/176* (2014.11); *H04N 19/182* (2014.11); *H04N 19/46* (2014.11); *H04N 19/82* (2014.11)

(58) Field of Classification Search
CPC .................................... H04N 19/593
USPC ........................ 375/240.01–240.29
See application file for complete search history.

(56) References Cited

U.S. PATENT DOCUMENTS

| | | | |
|---|---|---|---|
| 2013/0016778 A1 | 1/2013 | Ameres et al. | |
| 2013/0034158 A1* | 2/2013 | Kirchhoffer ......... | H04N 19/159 375/240.12 |
| 2017/0347093 A1* | 11/2017 | Yu ......................... | H04N 19/105 |
| 2017/0359595 A1* | 12/2017 | Zhang .................. | H04N 19/159 |
| 2019/0045186 A1* | 2/2019 | Zhang .................. | H04N 19/176 |

FOREIGN PATENT DOCUMENTS

| | | |
|---|---|---|
| CN | 101361370 A | 2/2009 |
| CN | 101543082 A | 9/2009 |
| CN | 102845063 A | 12/2012 |
| CN | 106688238 A | 5/2017 |
| CN | 107071417 A | 8/2017 |

* cited by examiner

*Primary Examiner* — Leron Beck
(74) *Attorney, Agent, or Firm* — ScienBiziP, P.C.

(57) ABSTRACT

A method of decoding a bitstream by an electronic device is provided. A directional mode of a block unit is determined from the bitstream. A plurality of reference lines neighboring to the block unit are determined based on the block unit. Each of the reference lines includes a plurality of neighboring samples. A plurality of reference samples are determined along an orientation of the directional mode based on the neighboring samples in at least one of the reference lines. A smoothed sample is generated for reconstructing an image frame including the block unit based on the reference samples.

16 Claims, 10 Drawing Sheets

DEVICE AND METHOD FOR CODING VIDEO DATA BASED ON MULTIPLE REFERENCE LINES

CROSS-REFERENCE TO RELATED APPLICATION(S)

The present application claims the benefit of and priority to a provisional U.S. Patent Application Ser. No. 62/556,021 filed on Sep. 8, 2017, entitled "Decoder Derived Method for Intra Prediction" (hereinafter referred to as "US71896 application") and a provisional U.S. Patent Application Ser. No. 62/587,676 filed on Nov. 17, 2017, entitled "Intra Prediction Generation Method" (hereinafter referred to as "US72311 application"). The disclosures of the US71896 and US72311 applications are hereby incorporated fully by reference into the present application.

FIELD

The present disclosure generally relates to video coding, and more particularly, to techniques for intra prediction based on multiple reference lines.

BACKGROUND

The intra prediction is a coding tool in a video coding method. In the conventional video coding method, an encoder and a decoder only use the previously reconstructed pixels in a closest pixel line adjacent to a coding block to generate reference pixels and predictors for predicting or reconstructing the coding block. However, the closest pixel line may include a texture of a first object different from a second object in the coding block and/or signal noise. Thus, the encoder can exploit the closest pixel line and other adjacent pixel lines near the closest pixel line to generate the reference pixels and the predictors.

When the encoder exploits more than one pixel line to generate the reference pixels and the predictors, the encoder needs to signal a flag indicating the selected reference lines into a bitstream. As a result, it is necessary for the decoder to parse the flag from the bitstream and determine, based on the flag, which of the pixel lines are selected for the coding block.

SUMMARY

The present disclosure is directed to a device and method for coding video data based on multiple reference lines.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

DETAILED DESCRIPTION

Figure 1:
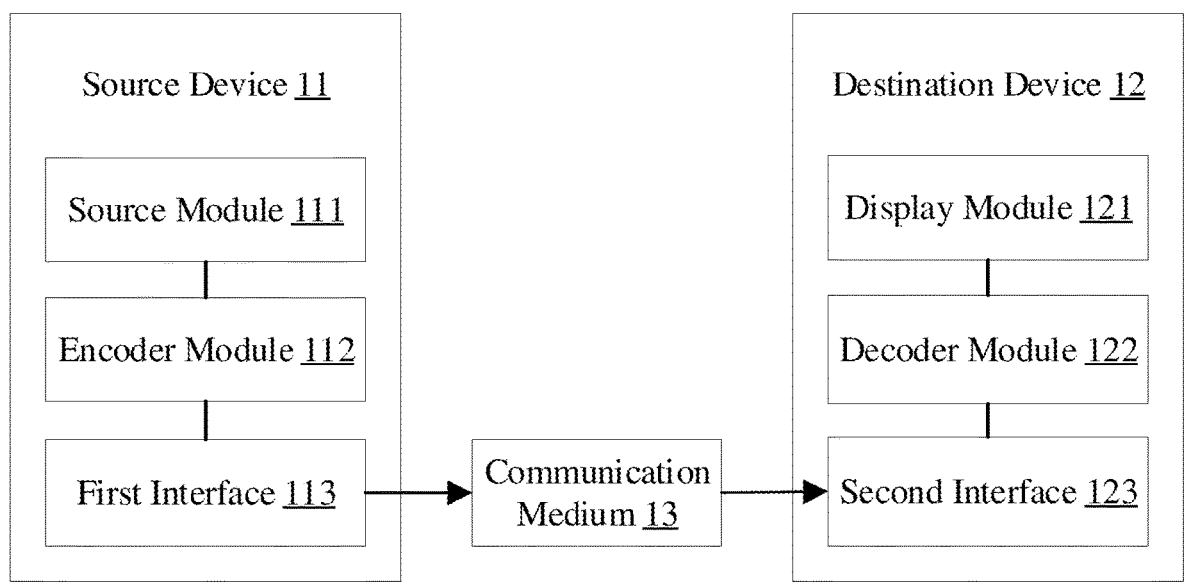
FIG. 1 is a block diagram of an exemplary implementation of a system configured to encode and decode video data according to one or more techniques of this disclosure.

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the exemplary figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any coding function(s) or algorithm(s) described in the present disclosure may be implemented by hardware, software or a combination of software and hardware. Described functions may correspond to modules may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of applications specific integrated circuitry (ASIC), programmable logic arrays, and/or using one or more digital signal processor (DSPs). Although some of the exemplary implementations described in this specification are oriented to software installed and executing on computer hardware, nevertheless, alternative exemplary implementations implemented as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

FIG. 1 is a block diagram of an exemplary implementation of a system that may be configured to encode and decode video data according to one or more techniques of this disclosure. In the implementation, the system includes a source device 11, a destination device 12, and communication medium 13. In at least one implementation, the source device 11 may include any device configured to encode video data and transmit encoded video data to the communication medium 13. In at least one implementation, the destination device 12 may include any device configured to receive encoded video data via the communication medium 13 and to decode encoded video data.

In at least one implementation, the source device 11 may wiredly and/or wirelessly communicate with the destination device 12 via the communication medium 13. The source device 11 may include a source module 111, an encoder module 112, and a first interface 113. The destination device 12 may include a display module 121, a decoder module 122, and a second interface 123. In at least one implementation, the source device 11 may be a video encoder, and the destination device 12 may be a video decoder.

In at least one implementation, the source device 11 and/or the destination device 12 may be a mobile phone, a tablet, a desktop, a notebook, or other electronic device. FIG. 1 illustrates only one example of the source device 11 and the destination device 12, and the source device 11 and the destination device 12 in other implementations may include more or less components than illustrated, or have a different configuration of the various components.

In at least one implementation, the source module 111 of the source device 11 may include a video capture device to capture a new video, a video archive storing previously captured video, and/or a video feed interface to receive video from a video content provider. In at least one implementation, the source module 111 of the source device 11 may generate computer graphics-based data as the source video, or a combination of live video, archived video, and computer-generated video. In at least one implementation, the video capturing device may be a charge-coupled device (CCD) image sensor, a complementary metal-oxide-semiconductor (CMOS) image sensor, or a camera.

In at least one implementation, the encoder module 112 and the decoder module 122 may each be implemented as any of a variety of suitable encoder/decoder circuitry, such as one or more microprocessors, a central processing unit (CPU), a graphic processing unit (GPU), a system on chip (SoC), digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. In at least one implementation, each of the encoder module 112 and the decoder module 122 may be included in one or more encoders or decoders, any of which may be integrated as part of a combined encoder/decoder (CODEC) in a respective device.

In at least one implementation, the first interface 113 and the second interface 123 may adopt customized protocols or follow existing standards or de facto standards including, but not limited to, Ethernet, IEEE 802.11 or IEEE 802.15 series, Wireless USB or telecommunication standards including, but not limited to, GSM, CDMA2000, TD-SCDMA, WiMAX, 3GPP-LTE or TD-LTE. In at least one implementation, the first interface 113 and the second interface 123 may each include any device configured to transmit and/or store a compliant video bitstream to the communication medium 13 and to receive the compliant video bitstream from the communication medium 13. In at least one implementation, the first interface 113 and the second interface 123 may include a computer system interface that may enable a compliant video bitstream to be stored on a storage device or to be received from the storage device. For example, the first interface 113 and the second interface 123 may include a chipset supporting Peripheral Component Interconnect (PCI) and Peripheral Component Interconnect Express (PCIe) bus protocols, proprietary bus protocols, Universal Serial Bus (USB) protocols, I2C, or any other logical and physical structure that may be used to interconnect peer devices.

In at least one implementation, the display module 121 may include a display using liquid crystal display (LCD) technology, a plasma display technology, an organic light emitting diode (OLED) display technology, or light emitting polymer display (LPD) technology, although other display technologies may be used in other implementations. In at least one implementation, the display module 121 may include a high definition display or an ultra high definition display.

Figure 2:
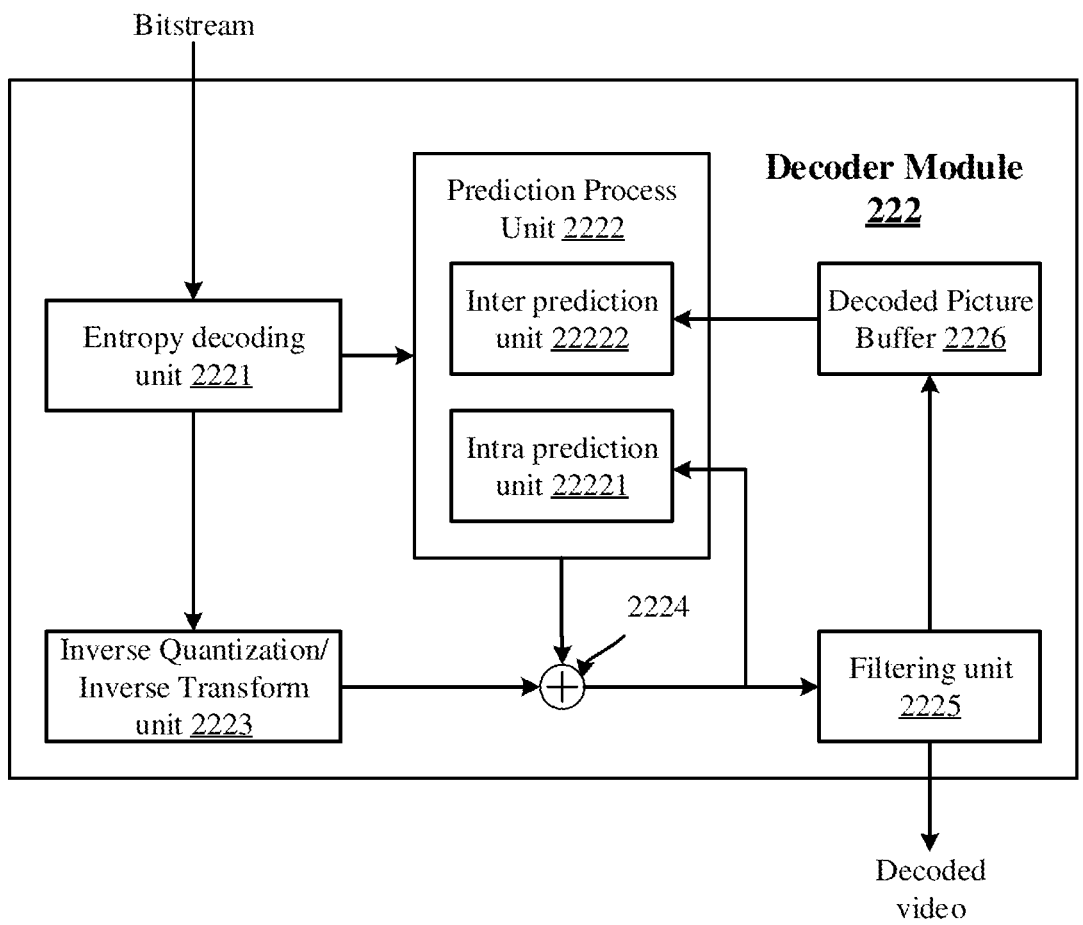
FIG. 2 is a block diagram of an exemplary implementation of the decoder module of the destination device in the system of FIG. 1.

FIG. 2 is a block diagram of a decoder module 222 representing an exemplary implementation of the decoder module 122 of the destination device 12 in the system of FIG. 1. In at least one implementation, the decoder module 222 includes an entropy decoding unit 2221, a prediction process unit 2222, an inverse quantization/inverse transform unit 2223, a first summer 2224, a filtering unit 2225, and a decoded picture buffer 2226. In at least one implementation, the prediction process unit 2222 of the decoder module 222 further includes an intra prediction unit 22221, and an inter prediction unit 22222. In at least one implementation, the decoder module 222 receives a bitstream, and decodes the bitstream to output a decoded video.

In at least one implementation, the entropy decoding unit 2221 may receive the bitstream including a plurality of syntax elements from the second interface 123 in FIG. 1, and perform a parsing operation on the bitstream to extract syntax elements from the bitstream. As part of performing the parsing operation, the entropy decoding unit 2221 may entropy decode the bitstream to generate quantized transform coefficients, quantization parameters, transform data, motion vectors, intra modes, partition information, and other syntax information. In at least one implementation, the entropy decoding unit 2221 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique to generate the quantized transform coefficients. In at least one implementation, the entropy decoding unit 2221 provides the quantized transform coefficients, the quantization parameters, and the transform data to the inverse quantization/inverse transform unit 2223, and provides the motion vectors, the intra modes, the partition information, and other syntax information to the prediction process unit 2222.

In at least one implementation, the prediction process unit 2222 may receive syntax elements, such as motion vectors, intra modes, partition information, and other syntax information, from the entropy decoding unit 2221. In at least one implementation, the prediction process unit 2222 may receive the syntax elements including the partition information, and then divide image frames according to the partition information. In at least one implementation, each of the image frames may be divided into at least one image block according to the partition information. The at least one image block may include a luminance block for reconstructing a plurality of luminance samples, and at least one chrominance block for reconstructing a plurality of chrominance samples. The luminance block and the at least one chrominance block may be further divided to generate macroblocks, coding tree units (CTUs), coding blocks (CBs), sub-divisions thereof, and/or another equivalent coding unit.

In at least one implementation, during the decoding process, the prediction process unit 2222 receives predicted data including the intra mode or the motion vector for a current image block of a specific one of the image frames. The current image block may be one of the luminance block and the at least one of the chrominance block in the specific image frame.

In at least one implementation, the intra prediction unit 22221 may perform intra-predictive coding of a current block unit relative to one or more neighboring blocks in the same frame as the current block unit based on the syntax elements related to the intra mode to generate a predicted block. In at least one implementation, the intra mode may specify the location of reference samples selected from the neighboring blocks within the current frame.

In at least one implementation, the intra prediction unit 22221 may reconstruct a plurality of chroma components of the current block unit based on the plurality of luma components of the current block unit, when the luma components of the current block are reconstructed by the prediction process unit 2222.

In at least one implementation, the inter prediction unit 22222 may perform inter-predictive coding of the current block unit relative to one or more blocks in one or more reference image block based on the syntax elements related to the motion vector to generate the predicted block. In at least one implementation, the motion vector may indicate a displacement of the current block unit within the current image block relative to a reference block unit within the reference image block. The reference block unit is a block that is determined to closely match the current block unit. In at least one implementation, the inter prediction unit 22222 receives the reference image block stored in the decoded picture buffer 2226 and reconstructs the current block unit based on the received reference image blocks.

In at least one implementation, the inverse quantization/inverse transform unit 2223 may apply inverse quantization and inverse transformation to reconstruct the residual block in the pixel domain. In at least one implementation, the inverse quantization/inverse transform unit 2223 may apply inverse quantization to the residual quantized transform coefficient to generate a residual transform coefficient, and then apply inverse transformation to the residual transform coefficient to generate the residual block in the pixel domain. In at least one implementation, the inverse transformation may be inversely applied the transformation process, such as discrete cosine transform (DCT), discrete sine transform (DST), adaptive multiple transform (AMT), mode-dependent non-separable secondary transform (MDNSST), hyper-cube-givens transform (HyGT), signal dependent transform, Karhunen-Loéve transform (KLT), wavelet transform, integer transform, sub-band transform or a conceptually similar transform. In at least one implementation, the inverse transformation may convert the residual information from a transform domain, such as a frequency domain, back to the pixel domain. In at least one implementation, the degree of inverse quantization may be modified by adjusting a quantization parameter.

In at least one implementation, the first summer 2224 adds the reconstructed residual block to the predicted block provided from the prediction process unit 2222 to produce a reconstructed block.

In at least one implementation, the filtering unit 2225 may include a deblocking filter, a sample adaptive offset (SAO) filter, a bilateral filter, and/or an adaptive loop filter (ALF) to remove blockiness artifacts from the reconstructed block. Additional filters (in loop or post loop) may also be used in addition to the deblocking filter, the SAO filter, the bilateral filter and the ALF. Such filters are not shown for brevity, but if desired, may filter the output of the first summer 2224. In at least one implementation, the filtering unit 2225 may output the decoded video to the display module 121 or other video receiving unit, after the filtering unit 2225 performs the filtering process for the reconstructed blocks of the specific image frame.

In at least one implementation, the decoded picture buffer 2226 may be a reference picture memory that stores the reference block for use in decoding the bitstream by the prediction process unit 2222, e.g., in inter-coding modes. The decoded picture buffer 2226 may be formed by any of a variety of memory devices, such as dynamic random access memory (DRAM), including synchronous DRAM (SDRAM), magneto-resistive RAM (MRAM), resistive RAM (RRAM), or other types of memory devices. In at least one implementation, the decoded picture buffer 2226 may be on-chip with other components of the decoder module 222, or off-chip relative to those components.

Figure 3:
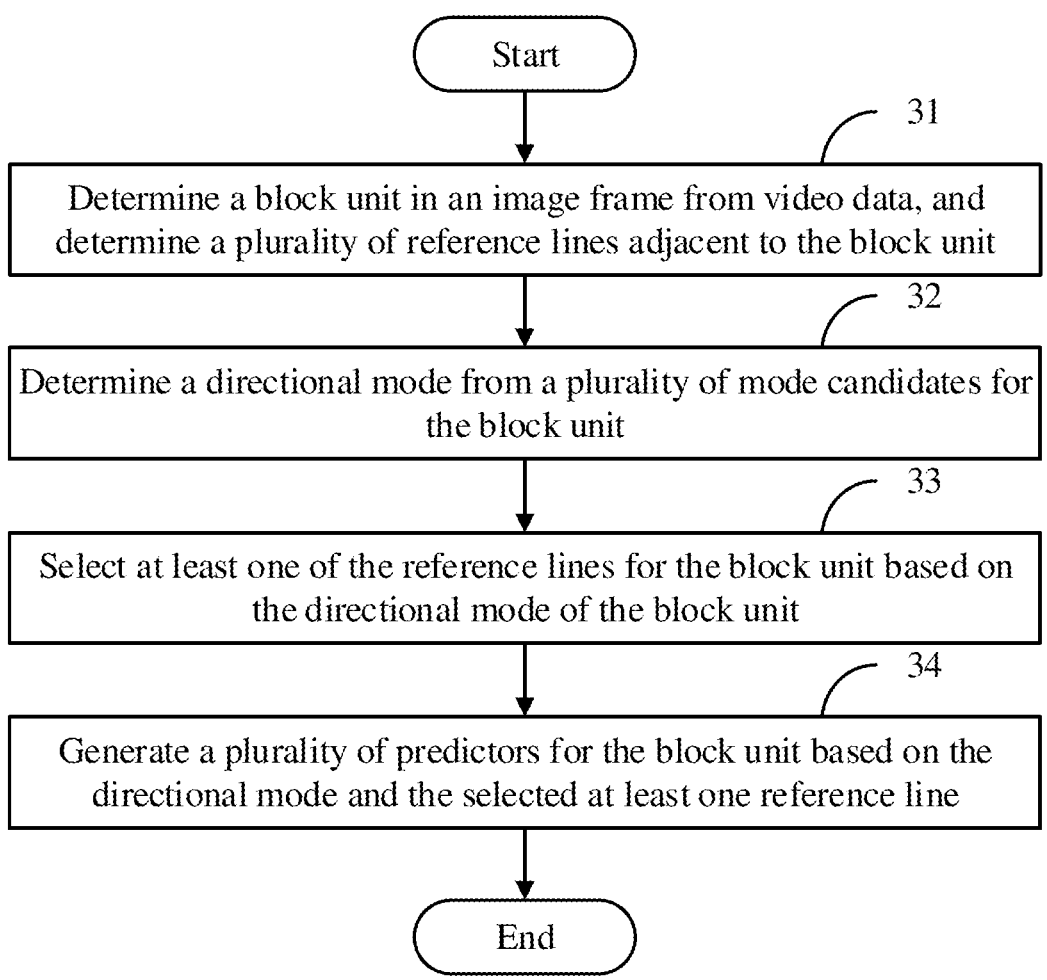
FIG. 3 illustrates a flowchart in accordance with a first exemplary implementation of the multi-reference line prediction for intra prediction.

FIG. 3 illustrates a flowchart in accordance with a first exemplary implementation of the multi-reference line prediction for intra prediction. The example method is provided by way of example only, as there are a variety of ways to carry out the method. The method described below may be carried out using the configuration illustrated in FIG. 1 and FIG. 2, for example, and various elements of these figures are referenced in explaining the example method. Each block shown in FIG. 3 represents one or more processes, methods, or subroutines, carried out in the example method. Furthermore, the order of blocks is illustrative only and may change. Additional blocks may be added or less blocks may be utilized without departing from this disclosure.

At block 31, the decoder module 222 determines a block unit in an image frame from video data, and determines a plurality of reference lines adjacent to the block unit.

In at least one implementation, the video data may be a bitstream. The destination device 12 may receive the bitstream from an encoder, such as the source device 11, via the second interface 123 of the destination device 12. The second interface 123 provides the bitstream to the decoder module 222. The decoder module 222 determines the image frame based on the bitstream, and divides the image frame to determine the block unit according to a plurality of partition indication in the bitstream. For example, the decoder module 222 may divide the image frames to generate a plurality of coding tree units, and further divide one of the coding tree units to determine the block unit according to the partition indications based on any video coding standard.

In at least one implementation, the entropy decoding unit 2221 may decode the bitstream to determine a plurality of prediction indications for the block unit, and then the decoder module 222 may further reconstruct the block unit based on the prediction indications. In at least one implementation, the prediction indications may include a plurality of flags and a plurality of indices.

Figure 4:
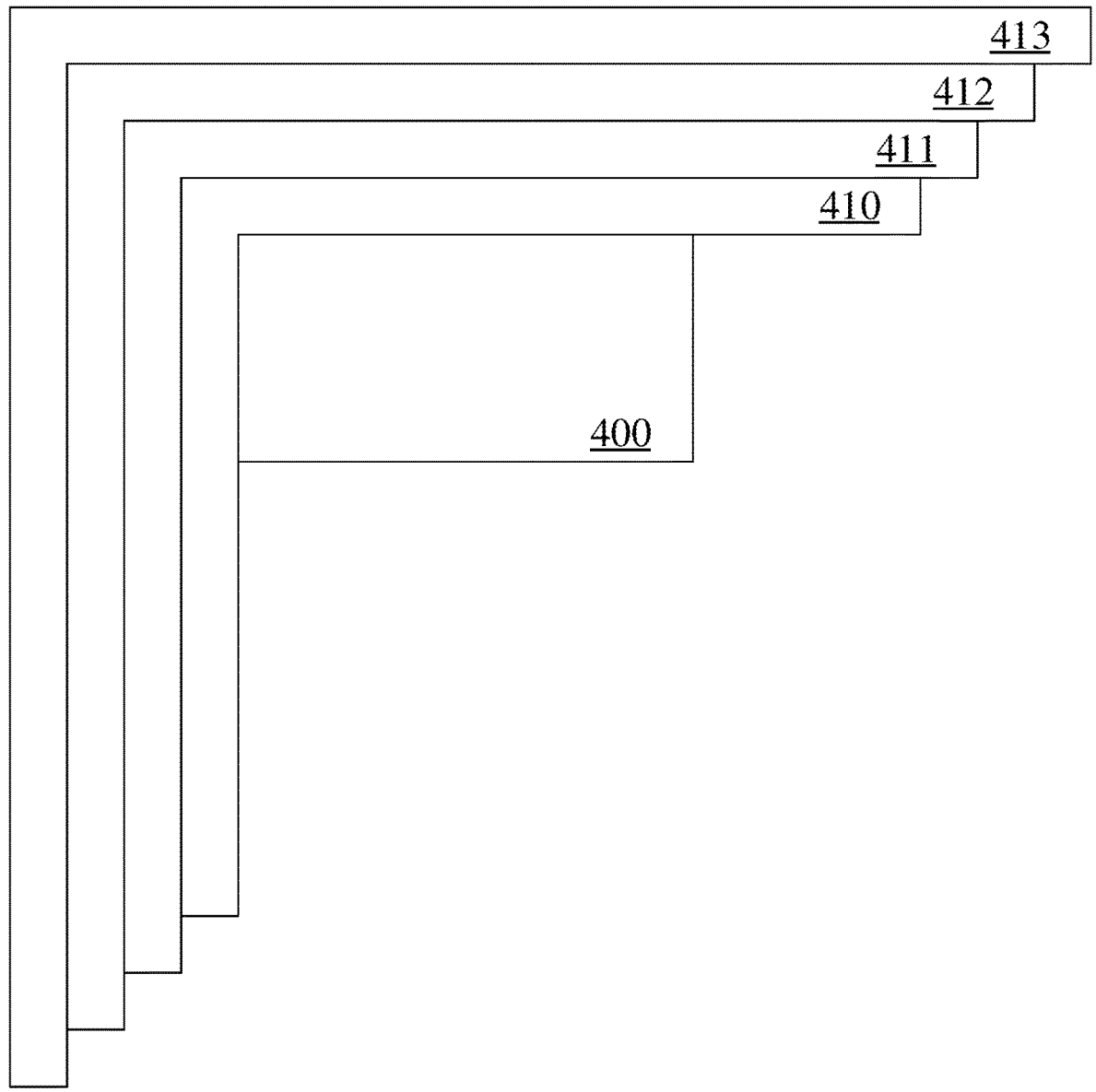
FIG. 4 is a schematic illustration of an exemplary implementation of the block unit and the reference lines.

In at least one implementation, the prediction process unit 2222 of the destination device 12 determines the block unit from the video data via the entropy decoding unit 2221, and determines the reference lines adjacent to the block unit. FIG. 4 is a schematic illustration of exemplary implementation of the block unit 400 and the reference lines 410, 411, 412, and 413. In at least one implementation, the number of the reference lines may be greater than two. For example, the number of the reference lines is equal to four in FIG. 4. In at least one implementation, each of the reference lines includes a plurality of neighboring samples. Each of the neighboring samples in the reference lines is reconstructed prior to reconstructing the block unit, so the neighboring samples may be a plurality of reference candidates for reconstructing the block unit.

At block 32, the intra prediction unit 22221 determines a directional mode from a plurality of mode candidates for the block unit.

In at least one implementation, the intra prediction unit 22221 may determine the directional mode based on the prediction indications. In one implementation, the prediction indications may include a most probable mode (MPM) flag, an MPM index, and a non-MPM index. For example, the MPM flag, MPM index, and the non-MPM index may be defined as prev_intra_luma_pred_flag, mpm_idx, and rem_intra_luma_pred_modes in high efficiency video coding (HEVC). In the implementation, the mode candidates may be categorized into two different mode group. The first mode group includes a plurality of most probable modes (MPMs) of the block unit, and the second mode group includes the other mode candidates set as a plurality of non-MPMs. When the intra prediction unit 22221 determines the MPM flag is different from zero, the intra prediction unit 22221 may select the directional mode from the MPMs based on the MPM index. When the intra prediction unit 22221 determines the MPM flag is equal to zero, the intra prediction unit 22221 may select the directional mode from the non-MPMs based on the non-MPM index. In at least one implementation, the indices of the mode candidates include 0 to 34 for HEVC, and the indices of the mode candidates include 0 to 66 for versatile video coding (VVC) test model (VTM).

At block 33, the intra prediction unit 22221 selects at least one of the reference lines for the block unit based on the directional mode.

In at least one implementation, the intra prediction unit 22221 may determine whether the selected at least one reference line is the first reference line 410 based on the prediction indications. In one implementation, the prediction indications may further include a pixel line (PL) flag, such as Enabled_farther_PL_flag. When the intra prediction unit 22221 determines the PL flag is equal to zero, the intra prediction unit 22221 may directly select the first reference line 410. When the intra prediction unit 22221 determines the PL flag is different from zero, the intra prediction unit 22221 may select at least one of the reference lines for the block unit based on the directional mode.

In at least one implementation, the intra prediction unit 22221 may select the neighboring samples from the reference lines based on the directional mode, and set the selected neighboring samples as a plurality of reference candidates. In the implementation, the intra prediction unit 22221 may compare the reference candidates in a first one of the reference lines with the reference candidates in the other reference lines. Then, the intra prediction unit 22221 may compare the reference candidates in a next one of the reference lines with the reference candidates in the other reference lines until that each of the reference lines has a first comparison result. In the implementation, the intra prediction unit 22221 may further compare the first comparison results of the reference lines to each other. Then, the intra prediction unit 22221 may select the at least one reference line based on a second comparison result between the first comparison results.

In at least one implementation, the source device 11 may determine the block unit in the image frame, and the reference lines and the directional mode of the block unit, when the source device 11 encodes another video data (e.g., a video) to the bitstream. Thus, the source device 11 and the destination device 12 may determine the same block unit in the same image frame, the same reference lines and the same directional mode, since the partition indications and the prediction indications for determining the block unit and the directional mode in the destination device 12 are generated by the source device 11. Since the comparisons performed by the source device 11 may be identical to the comparisons performed by the destination device 12, it is unnecessary to signal a flag indicating the selected at least one reference line into the bitstream for providing the flag from the source device 11 to the destination device 12. Thus, the intra prediction unit 22221 may determine the selected at least one reference line for the block unit based on the directional mode without parsing a further syntax element in the bitstream.

At block 34, the intra prediction unit 22221 generates a plurality of predictors for the block unit based on the directional mode and the selected at least one reference line.

In at least one implementation, the block unit may include a plurality of block elements. In the implementation, each of the block elements may be a pixel element. The intra prediction unit 22221 may select, along the orientation, at least one of the reference samples in the selected at least one reference line for each of the block elements. Then, the intra prediction unit 22221 may generate one of the predictors for each of the block elements by multiplying the selected at least one reference sample with at least one predefined weighting parameter.

In at least one implementation, the first summer 2224 of the decoder module 222 in the destination device 12 may add the predictors into a plurality of residual samples determined from the bitstream to reconstruct the block unit. In addition, the decoder module 222 may reconstruct all of the other block units in the image frame for reconstructing the image frame and the video.

Figure 5:
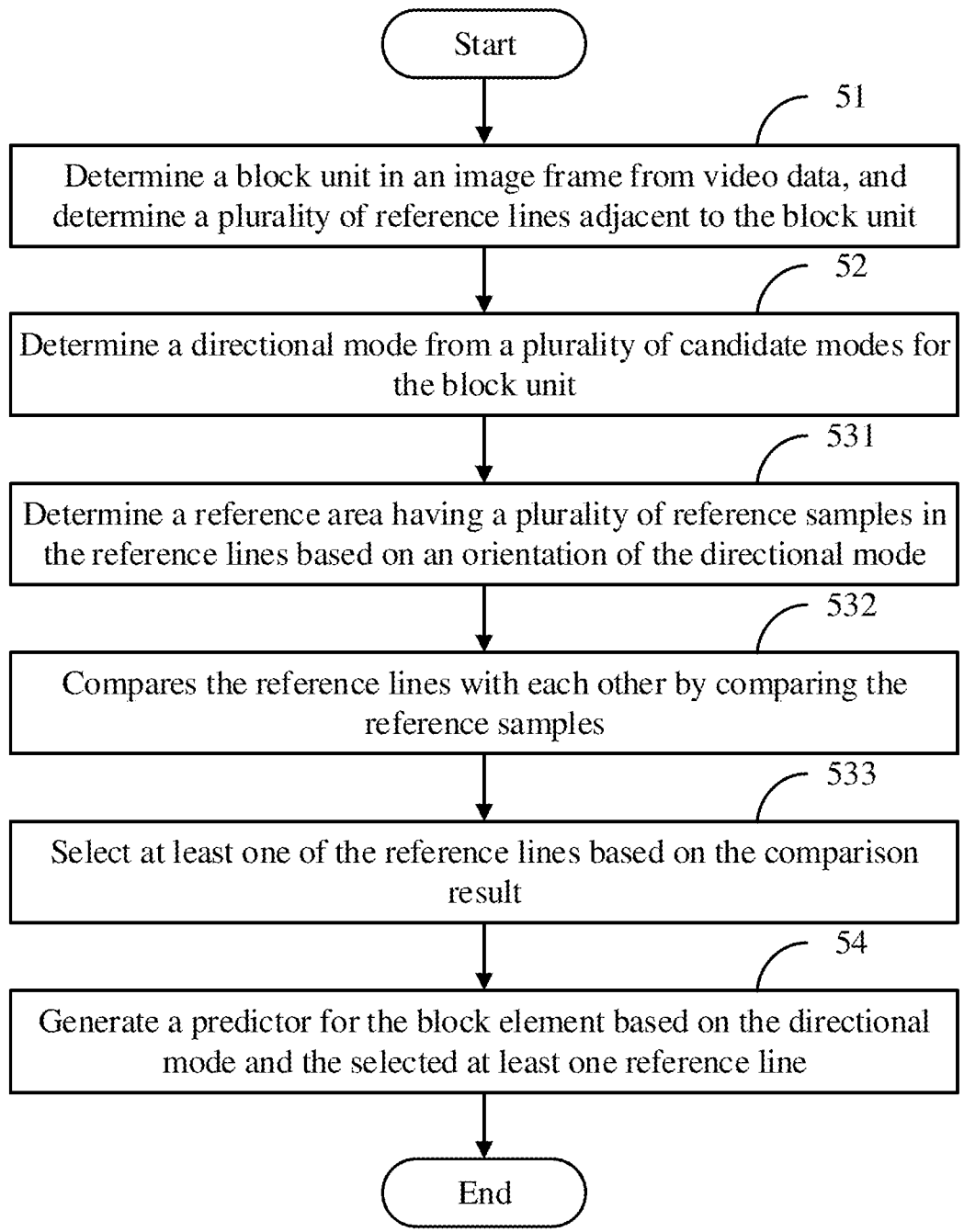
FIG. 5 illustrates a flowchart in accordance with a second exemplary implementation of the multi-reference line prediction for intra prediction.

FIG. 5 illustrates a flowchart in accordance with a second exemplary implementation of the multi-reference line prediction for intra prediction. The example method is provided by way of example, as there are a variety of ways to carry out the method. The method described below may be carried out using the configuration illustrated in FIG. 1 and FIG. 2, for example, and various elements of these figures are referenced in explaining the example method. Each block shown in FIG. 5 represents one or more processes, methods, or subroutines, carried out in the example method. Furthermore, the order of blocks is illustrative only and may change. Additional blocks may be added, or less blocks may be utilized without departing from this disclosure.

At block 51, the decoder module 222 determines a block unit in an image frame from video data, and determines a plurality of reference lines adjacent to the block unit.

In at least one implementation, the video data may be a bitstream. The destination device 12 may receive the bitstream from an encoder, such as the source device 11, via the second interface 123 of the destination device 12. The second interface 123 provides the bitstream to the decoder module 222. The decoder module 222 determines an image frame based on the bitstream, and divides the image frame to determine the block unit according to a plurality of partition indications in the bitstream.

In at least one implementation, the entropy decoding unit 2221 may decode the bitstream to determine a plurality of prediction indications for the block unit, and then the decoder module 222 may further reconstruct the block unit based on the prediction indications. In at least one implementation, the prediction indications may include a plurality of flags and a plurality of indices.

In at least one implementation, the prediction process unit 2222 of the destination device 12 determines the block unit from the video data via the entropy decoding unit 2221, and determines the reference lines adjacent to the block unit. In at least one implementation, each of the reference lines includes a plurality of neighboring samples. Each of the neighboring samples in the reference lines is reconstructed prior to reconstructing the block unit, so the neighboring samples may be a plurality of reference candidates for the block unit.

At block 52, the intra prediction unit 22221 determines a directional mode from a plurality of mode candidates for the block unit.

In at least one implementation, the intra prediction unit 22221 may determine the directional mode based on the prediction indications. In one implementation, the prediction indications may include an MPM flag, an MPM index, and a non-MPM index. In the implementation, the mode candidates may be categorized into two different mode group. The first mode group includes a plurality of MPMs of the block unit, and the second mode group includes the other mode candidates set as a plurality of non-MPMs. When the intra prediction unit 22221 determines the MPM flag is different from zero, the intra prediction unit 22221 may select the directional mode from the MPMs based on the MPM index. When the intra prediction unit 22221 determines the MPM flag is equal to zero, the intra prediction unit 22221 may select the directional mode from the non-MPMs based on the non-MPM index. In at least one implementation, the indices of the mode candidates include 0 to 34 for HEVC, and the indices of the mode candidates include 0 to 66 for VTM.

At block 531, the intra prediction unit 22221 determines a reference area having a plurality of reference candidates in the reference lines based on an orientation of the directional mode.

Figure 6:
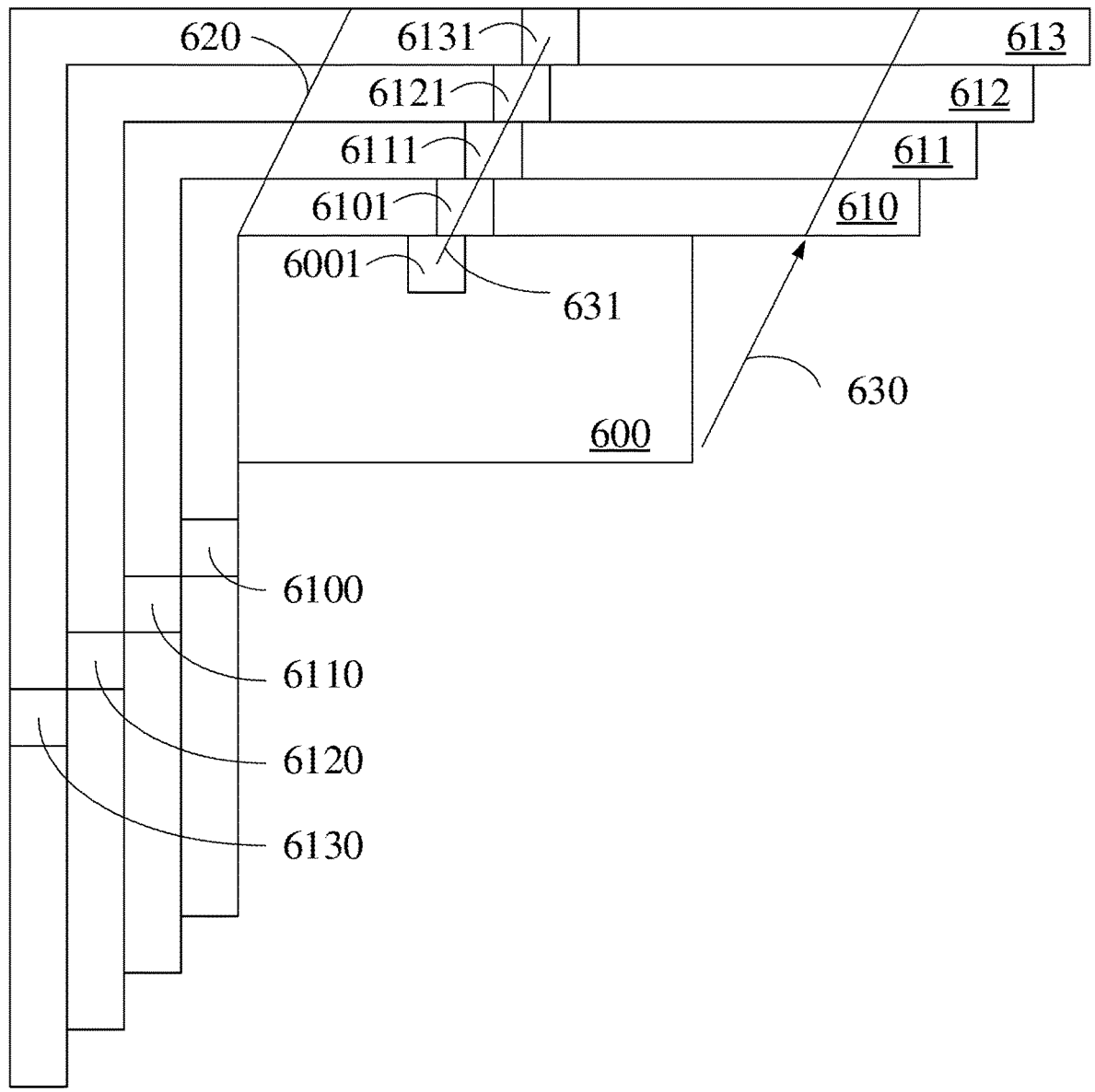
FIG. 6 is a schematic illustration of an exemplary implementation of the block unit having a block element, the reference lines having a plurality of neighboring samples, and a reference area defined by the orientation of the directional mode.

In at least one implementation, the intra prediction unit 22221 may determine the reference area based on the orientation. FIG. 6 is a schematic illustration of exemplary implementation of the block unit 600 having a block element 6001, the reference lines 610, 611, 612, and 613 having a plurality of neighboring samples 6100, 6110, 6120, and 6130, and a reference area 620 defined by the orientation 630 of the directional mode. When the orientation 630 is a first direction from the bottom-left to the top-right, the reference areas is determined based on the top-left corner and the bottom right corner of the block unit 600. In at least one implementation, each of the neighboring samples is located at an integer location in the reference lines.

In at least one implementation, the intra prediction unit 22221 may determine the reference candidates in the reference lines along the orientation. For example, the intra prediction unit 22221 may determine the reference candidates 6101, 6111, 6121, and 6131 in the reference lines 610, 611, 612, and 613, respectively, by directing from the block element 6001 toward the reference line 613 along a directional line 631 determined based on the orientation 630. In the implementation, the block element 6001 is located at an integer location in the block unit 600. However, the reference candidates 6101, 6111, 6121, and 6131 in the reference lines 610, 611, 612, and 613, respectively, may be located at fractional locations in the reference lines. In at least one implementation, the intra prediction unit 22221 may select more than one of the neighboring samples neighboring with a specific one of the reference candidates and interpolate the selected neighboring samples to determine a sample value of the specific reference candidate, when the specific reference candidate is located at the fractional location.

In at least one implementation, each of the block elements, the neighboring samples, and the reference candidates may be defined as p (x, y), and the location of the block element at the top-left corner of the block unit 600 may be defined as an origin. In the implementation, the x-coordinate of the block elements in the block unit 600 may be equal to 0, 1, . . . , W-2, and W-1, and the y-coordinate of the block elements in the block unit 600 may be equal to 0, 1, . . . , H-2, and H-1. In the implementation, the x-coordinate of the neighboring samples and the reference candidates located on the left side of the block unit 600 is less than zero, and the y-coordinate of the neighboring samples and the reference candidates located above the block unit 600 is less than zero. When the x-coordinate and y-coordinate of a reference candidate are integers, this reference candidate is located at an integer location. When one of the x-coordinate and y-coordinate of a reference candidate is not an integer, this reference candidate is located at a fractional location. In at least one implementation, each of the neighboring samples may also be defined as the i-th reference candidate $r_{i,j}$ in the j-th reference line. In at least one implementation, the orientation may be defined as a parameter intraPredAngle. In the implementation, the parameter intraPredAngle may be defined based on any video coding standard, such as HEVC, and VVC. The parameter intraPredAngle may be left shifted with N bits for N-bit fractional precision. For example, N may be equal to five.

Figure 7A:
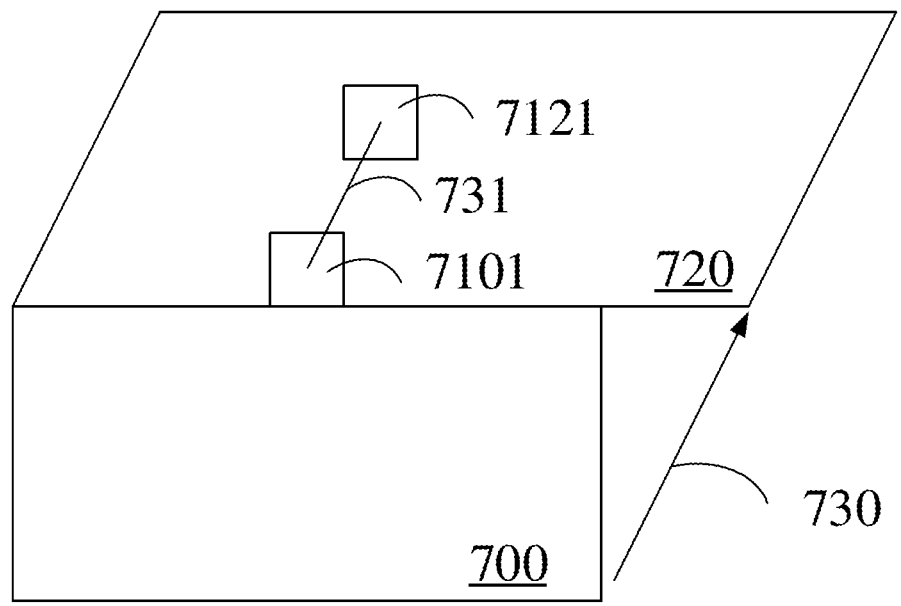
FIGS. 7A and 7B are schematic illustrations of an exemplary implementation of the block unit, and the reference area having a plurality of reference candidates and defined by a directional line of the directional mode along an orientation.

In at least one implementation, the x-coordinate for each of the reference candidates may be an integer or a non-integer and the y-coordinate for each of the reference candidates is an integer, when the orientation of the directional mode is the first direction directed from the bottom-left to the top-right. For example, the index of the directional mode having the first direction may be 26 to 34 in HEVC. FIG. 7A is a schematic illustration of exemplary implementation of the block unit 700, the reference area 720 having a plurality of reference candidates 7101 and 7121 and defined by a directional line 731 of the directional mode along an orientation 730. In the implementation, the i-th reference candidate $r_{i,0}$ in the 0-th reference line is identical to the reference candidate p (i, −1). The difference between x-coordinates of the i-th reference candidate $r_{i,0}$ in the 0-th reference line and the i-th reference candidate $r_{i,j}$ in the j-th reference line is equal to (intraPredAngle×j)/32, when the parameter intraPredAngle is left shifted with 5 bits for 5-bit fractional precision. In order to avoid floating points in hardware implementation, the difference in the horizontal axis may be represented by an integer part iIdx=(intraPredAngle×j)>>5 and a fractional part iFact=(intraPredAngle×j) & 31. Then, the i-th reference candidate $r_{i,j}$ in the j-th reference line may be derived by interpolating the neighboring sample p (i+iIdx, −1−j) in the j-th reference line and other neighboring samples adjacent to the neighboring sample p (i+iIdx, −1−j). In at least one implementation, the intra prediction unit 22221 may use a two-tap linear interpolation filter to determine the sample value of the reference candidate. Thus, the i-th reference candidate $r_{i,j}$ in the j-th reference line may be derived by two neighboring samples p (i+iIdx, −1−j) and p (i+iIdx+1, −1−j) in the j-th reference line by the following equation (1):

$$r_{i,j}=[(32-iFact) \times p(i+iIdx,-1-j)+iFact \times p(i+iIdx+1,-1-j)+16]>>5 \qquad (1)$$

In at least one implementation, the integer part iIdx is equal to (intraPredAngle×j)>>6, the fractional part iFact is equal to (intraPredAngle×j) & 63, when the parameter intraPredAngle may be left shifted with 6 bits for 6-bit fractional precision. In addition, the equation 1 may be adjusted to [(64−iFact)×p(i+iIdx, −1−−j)+iFact×p(i+iIdx+1, −1−j)+32]>>6.

Figure 7B:
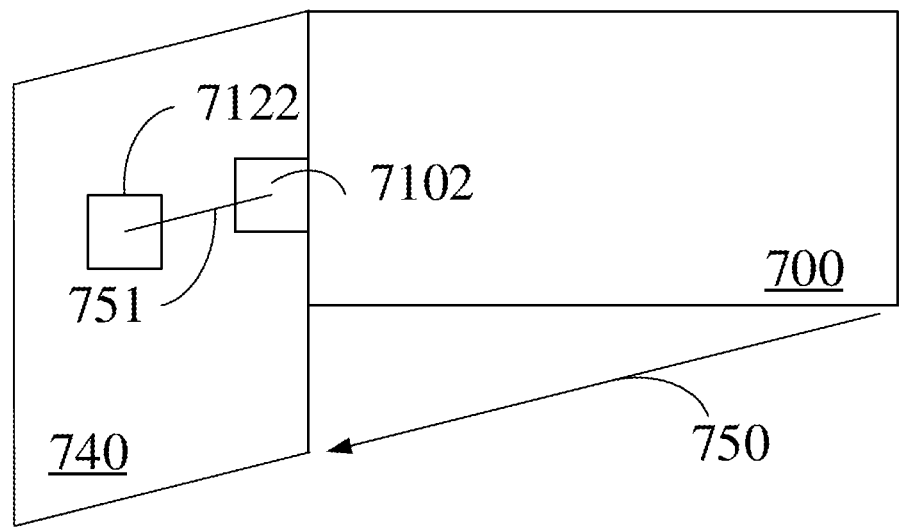

In at least one implementation, the x-coordinate for each of the reference candidates is an integer and the y-coordinate for each of the reference candidates may be an integer or a non-integer, when the orientation of the directional mode is a second direction directed from the top-right to the bottom-left. For example, the index of the directional mode having the second direction may be 2 to 10 in HEVC. FIG. 7B is a schematic illustration of exemplary implementation of the block unit 700, the reference area 740 having a plurality of reference candidates 7102 and 7122 and defined by a directional line 751 of the directional mode along an orientation 750. Since the orientation 750 is the second direction from the top-right to the bottom-left, the reference area 740 is determined based on the top-left corner and the bottom right corner of the block unit 700. In the implementation, the i-th reference candidate $r_{i,0}$ in the 0-th reference line is identical to the reference candidate p (−1, i). Thus, the difference between y-coordinates of the i-th reference candidate $r_{i,0}$ in the 0-th reference line and the i-th reference candidate $r_{i,j}$ in the j-th reference line may be represented by an integer part iIdx=(intraPredAngle×j)>>5 and a fractional part iFact=(intraPredAngle×j) & 31. Then, the i-th reference candidate $r_{i,j}$ in the j-th reference line may be derived by interpolating the neighboring sample p (−1−j, i+iIdx) in the j-th reference line and other neighboring samples adjacent to the neighboring sample p (−1−j, i+iIdx). In at least one implementation, the intra prediction unit 22221 may use a two-tap linear interpolation filter to determine the sample value of the reference candidate. Thus, the i-th reference candidate $r_{i,j}$ in the j-th reference line may be derived by two neighboring samples p (−1−j, i+iIdx) and p (−i−j, i+iIdx+1) in the j-th reference line by the following equation (2):

$$r_{i,j}=[(32-iFact) \times p(-1-j,i+iIdx)+iFact \times p(-1-j,i+iIdx+1)+16]>>5 \qquad (2)$$

In at least one implementation, the integer part iIdx is equal to (intraPredAngle×j)>>6, the fractional part iFact is equal to (intraPredAngle×j) & 63, when the parameter intraPredAngle may be left shifted with 6 bits for 6-bit fractional precision. In addition, the equation 2 may be adjusted to [(64−iFact)×p(−1−−j, iIdx)+iFact×p(−1−j, i+iIdx+1)+32]>>6.

Figure 8A:
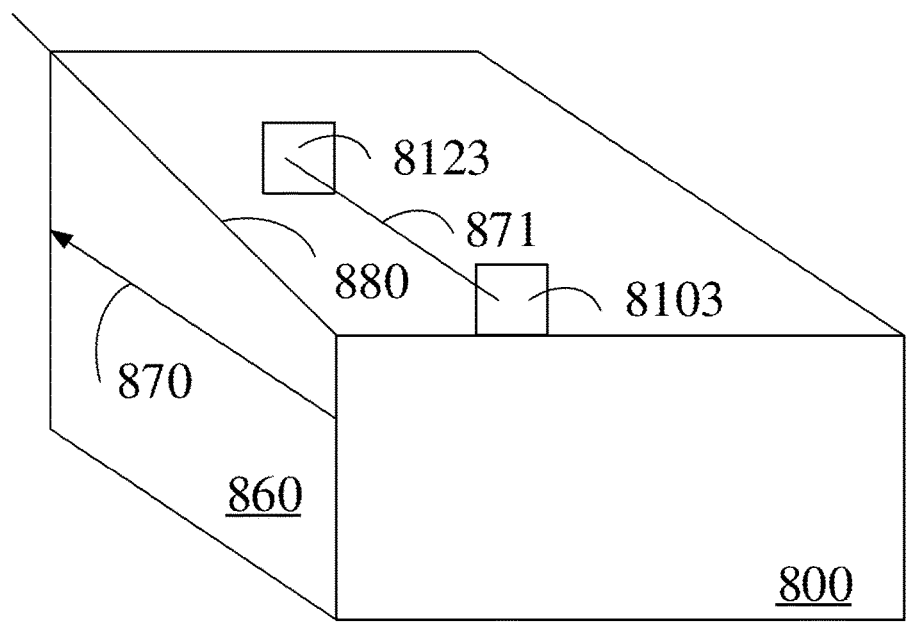
FIGS. 8A and 8B are schematic illustrations of an exemplary implementation of the block unit, the reference area having a plurality of reference candidates and defined by a directional line of the directional mode along an orientation, and a mapped area corresponding to the reference area and including a plurality of reference lines.
Figure 8B:
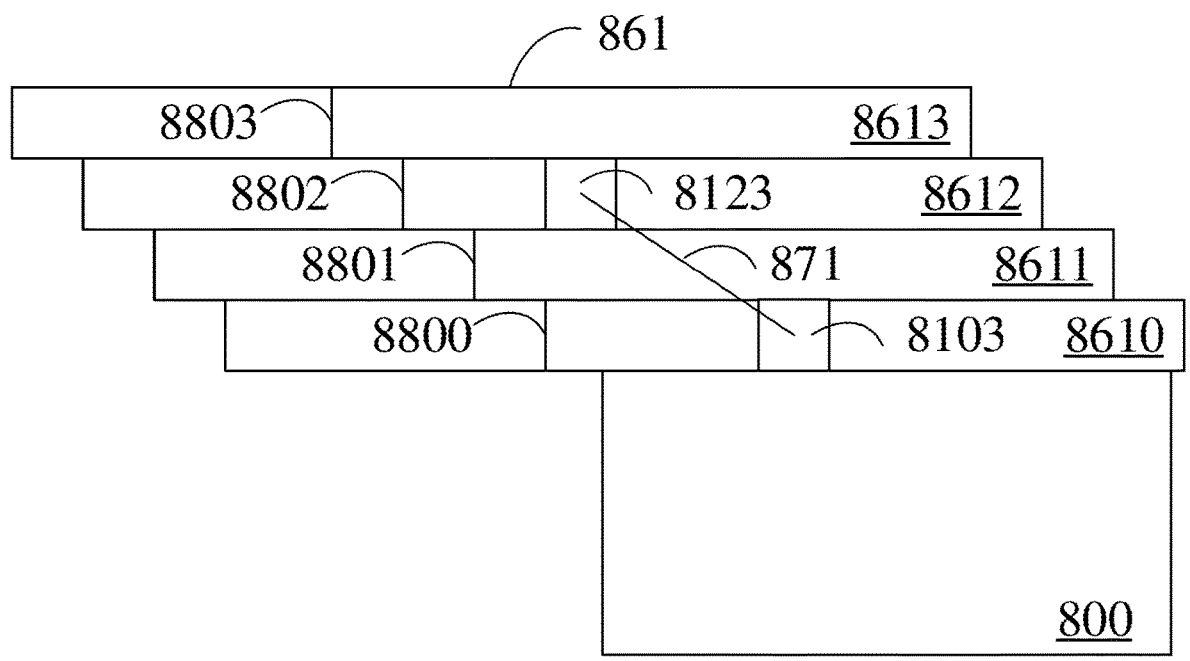

In at least one implementation, the x-coordinate for each of the reference candidates may be an integer or a non-integer and the y-coordinate for each of the reference candidates may be an integer or a non-integer, when the orientation of the directional mode is a third direction directed from the bottom-right to the top-left. For example, the index of the directional mode having the second direction may be 11 to 25 in HEVC. FIG. 8A is a schematic illustration of exemplary implementation of the block unit 800, the reference area 860 having a plurality of reference candidates 8103 and 8123 and defined by a directional line 871 of the directional mode along an orientation 870. Since the orientation 870 is the third from the bottom-right to the top-left, the reference area 860 is determined based on the top-right corner and the bottom-left corner of the block unit 800. In the implementation, the reference candidates in the reference area 860 may be located on the right side of a diagonal line 880 or located below the diagonal line 880. In the implementation, the location of the reference candidates below the diagonal line 880 may be adjusted to align with the reference candidates located on the right side of the diagonal line 880. FIG. 8B is a schematic illustration of exemplary implementation of the block unit 800 and a mapped area 861 including a plurality of reference lines 8610-8613. In the implementation, the reference candidate 8103 is located in the reference line 8610, and the reference candidate 8123 is located in the reference 8612. The diagonal line 880 in FIG. 8A may be divided into a plurality of diagonal sub-lines 8800, 8801, 8802, and 8803. When the reference candidates are located on the right side of the diagonal sub-lines 8800, 8801, 8802, and 8803, the reference candidates in the j-th reference line may be represented by p (−1−j, −1−j), p (−j, −1−j), p (−j+1, −1−j), . . . , p (W−1+(intraPredAngle×j)>>5, −1−j) and p (W+(intraPredAngle×j)>>5, −1−j). In the implementation, W is equal to a block width of the block unit 800. When the reference candidates are located on the left side of the diagonal sub-lines 8800-8803, the reference candidates in the j-th reference line may be adjusted to generate a mapping sample represented by p (−1−j−d, −1−j). The mapping sample p (−1−j−d, −1−j) may be derived from the reference candidate p (−1−j, −1−j+d×(($2^{13}$/intraPredAngle)+128)>>8) located below the diagonal line 880 in FIG. 8A. In the implementation, the i-th reference candidate $r_{i,0}$ in the 0-th reference line 861 is identical to the reference candidate p (i, −1). Thus, the difference between x-coordinates of the i-th reference candidate $r_{i,0}$ in the 0-th reference line 8610 and the i-th reference candidate $r_{i,j}$ in the j-th reference line is equal to (intraPredAngle×j)/32, when the parameter intraPredAngle may be left shifted with 5 bits for 5-bit fractional precision. In order to avoid floating points in hardware implementation, the difference in horizontal axis may be represented by an integer part iIdx=(intraPredAngle×j)>>5 and a fractional part iFact=(intraPredAngle×j) & 31. Then, the i-th reference candidate $r_{i,j}$ in the j-th reference line may be derived by interpolating the neighboring sample p (i+iIdx, −1−j) in the j-th reference line and other neighboring samples adjacent to the neighboring sample p (i+iIdx, −1−j). In at least one implementation, the intra prediction unit 22221 may use a two-tap linear interpolation filter to determine the sample value of the reference candidate. Thus, the i-th reference candidate $r_{i,j}$ in the j-th reference line may be derived according to two neighboring samples p (i+iIdx, −1−j) and p (i+iIdx+1, −1−j) in the j-th reference line by the previous equation (1). In at least one implementation, the location of the reference candidates located on the right side of the diagonal line 880 in FIG. 8A may be adjusted to align with the reference candidates located below the diagonal line 880. Thus, the i-th reference candidate $r_{i,j}$ in the j-th reference line may be derived according to two neighboring samples p (−1−j, i+iIdx) and p (−i−j, i+iIdx+1) in the j-th reference line by the following equation (2).

In at least one implementation, the intra prediction unit 22221 may use a smoothing filter to filter the neighboring samples, which are reconstructed prior to the block unit 600. The intra prediction unit 22221 may determine filtered values of the neighboring samples in the reference candidates, and then determine the sample values of the reference candidates based on the filtered values of the neighboring samples. In at least one implementation, the sample value of the reference candidate may be directly determined by the neighboring samples without further filtering the neighboring samples. In at least one implementation, the intra prediction unit 22221 may determine the sample value of the reference candidate 6101 in the reference line 610 based on the filtered values of the neighboring samples, and determine the sample values of the reference candidates 6111, 6121, and 6131 in the other reference lines 611, 612, and 613 without further filtering the neighboring samples.

At block 532, the intra prediction unit 22221 compares the reference lines with each other by a comparison between the reference candidates in the reference lines.

In at least one implementation, the intra prediction unit 22221 may select a specific one of the reference lines, and compare each of the reference candidates in the specific reference line with the reference candidates in the other reference lines. In the implementation, the intra prediction unit 22221 compares each of the reference candidates in the specific reference line only with the reference candidates in each of the directional lines to generate a first comparison result of the specific reference line. In the implementation, the intra prediction unit 22221 may further select a next one of the reference lines, and perform the same comparison with the specific reference line to generate the first comparison result of the next reference line. Thus, the intra prediction unit 22221 may generate the first comparison result for each of the reference lines. For example, the intra prediction unit 22221 may select the reference line 610, and compare the reference candidates in the reference line 610 with the reference candidates in the reference lines 611, 612, and 613 to generate the first comparison result of the reference line 610. When the intra prediction unit 22221 may compare the reference candidate 6101 with the reference candidates in the reference lines 611, 612, and 613, the intra prediction unit 22221 may compare the reference candidate 6101 only with the reference candidates 6111, 6121, and 6131 since the reference candidates 6101, 6111, 6121, and 6131 are located along the directional line 631. In addition, the intra prediction unit 22221 may generate the first comparison results of the reference lines 611, 612, and 613 by performing the same comparison with the reference line 610.

In at least one implementation, the comparison between the reference candidates in the reference lines may be performed by computing sum of absolute difference (SAD) between the reference candidates in difference reference lines. For example, the intra prediction unit 22221 may compute sum of absolute difference between the reference candidates in the reference line 610 and the reference candidates in the reference lines 611-613, when the intra prediction unit 22221 compares the reference candidates in the reference line 610 with the reference candidates in the reference lines 611, 612, and 613. In at least one implementation, the SAD of the k-th reference line may be computed by the following equation (2):

$$I_k = \Sigma_i \Sigma_{j=k} w_{i,j} \times |r_{i,k} - r_{i,j}| \qquad (2)$$

where $r_{i,j}$ is the i-th reference candidate in the j-th reference line, and $w_{i,j}$ is a weighting coefficient of the i-th reference candidate in the j-th reference line. In at least one implementation, the weighting coefficient may be proportional to or related to the number of the neighboring samples that point to the position nearby or on the i-th reference candidate in k-th reference line along the orientation. In at least one implementation, the weighting coefficient may be proportional to or related to the distance between the i-th reference candidate in the j-th reference line and the block unit 600. For example, the reference candidate 6101 is closer to the block unit 600 than the reference candidate 6131, so the weighting coefficient of the reference candidate 6101 may be greater than the weighting coefficient of the reference candidate 6131. In at least one implementation, the intra prediction unit 22221 may use other comparison method, such as, sum of square error (SSE), Hadamard transformed SAD (SATD), and other cost functions to generate the first comparison results.

At block 533, the intra prediction unit 22221 selects at least one of the reference lines based on the comparison result.

In at least one implementation, the intra prediction unit 22221 may compare the first comparison results of the reference lines with each other, and select at least one of the reference lines having the low first comparison results. When the first comparison result of the specific reference line is low, the reference candidates of the specific reference line are high consistency with the reference candidates in the other reference lines. Thus, the intra prediction unit 22221 may select the reference candidates in the specific reference line to generate a plurality of predictors for the block unit. In one implementation, the intra prediction unit 22221 may select at least one of the reference lines having low SAD values, when the first comparison results are generated by computing SAD.

At block 54, the intra prediction unit 22221 generates a plurality of predictors for the block unit based on the directional mode and the selected at least one reference line.

In at least one implementation, the block unit may include a plurality of block elements. In the implementation, each of the block elements may be a pixel element. The intra prediction unit 22221 may select, along the orientation, at least one of the reference samples in the selected at least one reference line for each of the block elements. Then, the intra prediction unit 22221 may generate one of the predictors for each of the block elements by multiplying the selected at least one reference sample with at least one predefined weighting parameter.

In at least one implementation, the first summer 2224 of the decoder module 222 in the destination device 12 may add the predictors into a plurality of residual samples determined from the bitstream to reconstruct the block unit. In addition, the decoder module 222 may reconstruct all of the other block units in the image frame for reconstructing the image frame and the video.

Figure 9:
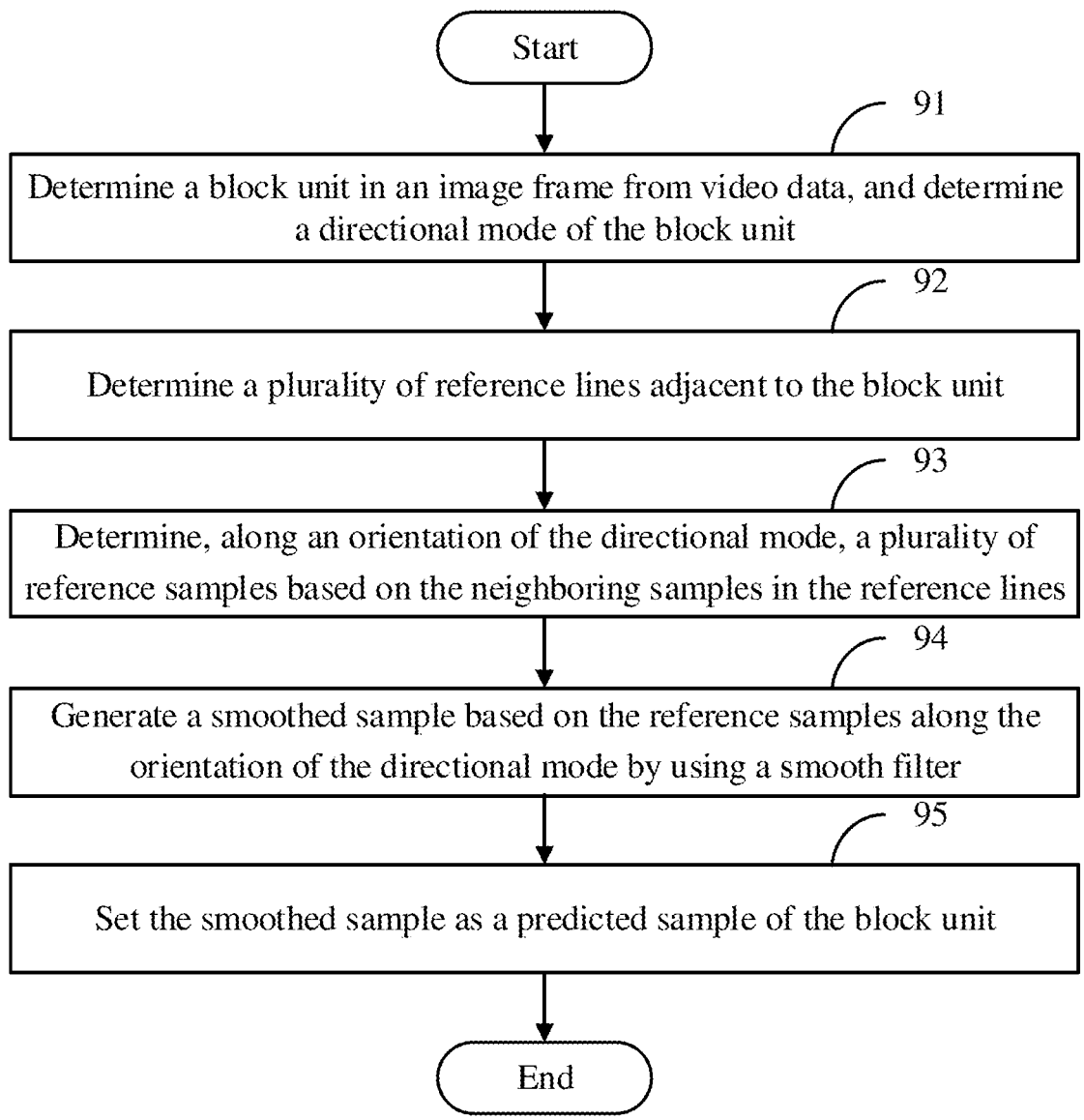
FIG. 9 illustrates a flowchart in accordance with a third exemplary implementation of the multi-reference line prediction for intra prediction.

FIG. 9 illustrates a flowchart in accordance with a third exemplary implementation of the multi-reference line prediction for intra prediction. The example method is provided by way of example, as there are a variety of ways to carry out the method. The method described below may be carried out using the configuration illustrated in FIG. 1 and FIG. 2, for example, and various elements of these figures are referenced in explaining the example method. Each block shown in FIG. 9 represents one or more processes, methods, or subroutines, carried out in the example method. Furthermore, the order of blocks is illustrative only and may change. Additional blocks may be added or less blocks may be utilized without departing from this disclosure.

At block 91, the decoder module 222 determines a block unit in an image frame from video data, and determines a directional mode from a plurality of mode candidates for the block unit.

In at least one implementation, the video data may be a bitstream. The destination device 12 may receive the bitstream from an encoder, such as the source device 11, via the second interface 123 of the destination device 12. The second interface 123 provides the bitstream to the decoder module 222. The decoder module 222 determines an image frame based on the bitstream, and divides the image frame to determine the block unit according to a plurality of partition indications in the bitstream.

In at least one implementation, the entropy decoding unit 2221 may decode the bitstream to determine a plurality of prediction indications for the block unit, and then the decoder module 222 may further reconstruct the block unit based on the prediction indications. In at least one implementation, the prediction indications may include a plurality of flags and a plurality of indices.

In at least one implementation, the intra prediction unit 22221 may determine the directional mode of the block unit based on the prediction indications in the bitstream. In one implementation, the prediction indications may include an MPM flag, an MPM index, and a non-MPM index. In the implementation, the mode candidates may be categorized into two different mode group. The first mode group includes a plurality of MPMs of the block unit, and the second mode group includes the other mode candidates set as a plurality of non-MPMs. When the intra prediction unit 22221 determines the MPM flag is different from zero, the intra prediction unit 22221 may select the directional mode from the MPMs based on the MPM index. When the intra prediction unit 22221 determines the MPM flag is equal to zero, the intra prediction unit 22221 may select the directional mode from the non-MPMs based on the non-MPM index. In at least one implementation, the mode candidates are intra prediction modes, and the indices of the mode candidates may include 0 to 34 for HEVC, or 0 to 66 for VTM.

At block 92, the intra prediction unit 22221 determines a plurality of reference lines adjacent to the block unit.

In at least one implementation, the prediction process unit 2222 of the destination device 12 determines the block unit from the video data via the entropy decoding unit 2221, and determines the reference lines adjacent to the block unit. In at least one implementation, each of the reference lines includes a plurality of neighboring samples. Each of the neighboring samples in the reference lines is reconstructed prior to reconstructing the block unit, so the neighboring samples may be a plurality of reference candidates for the block unit.

At block 93, the intra prediction unit 22221 determines a plurality of reference samples along an orientation of the directional mode based on the neighboring samples in the reference lines.

In at least one implementation, the block unit may include a plurality of block elements. The intra prediction unit 22221 may determine the reference candidates for each of the block elements along the orientation. In the implementation, the reference candidates for each of the block elements are selected from different reference lines. In FIG. 6, the intra prediction unit 22221 may determine the reference candidates 6101, 6111, 6121, and 6131 for the block element 6001 along the directional line 631 determined by the orientation 630. In addition, the intra prediction unit 22221 may select at least one of the reference lines based on the orientation of the directional mode, and then select a plurality of reference samples from the reference candidates in the selected reference lines for each of the block elements.

In at least one implementation, the intra prediction unit 22221 may determine the reference samples in the selected reference lines for each of the block elements, when the intra prediction unit 22221 determines the selected reference lines for the block unit. In at least one implementation, the determined reference samples may be located at integer location or at fractional location in the selected reference lines. In one implementation, a specific one of the determined reference samples may be equal to one of the neighboring samples, when the specific determined reference sample is located at integer location. In another implementation, the specific determined reference sample may be derived from at least two of the neighboring samples neighboring to the specific determined reference sample, when the specific determined reference sample is located at fractional location.

In at least one implementation, the intra prediction unit 22221 may determine one of the block elements at an element location in the block unit, and determine a directional line along the orientation of the directional mode from the element location. Thus, the intra prediction unit 22221 may determine a plurality of intersections between the directional line and the reference lines for the element location, and determines the reference candidates located at the intersections. In the implementation, each of the element locations is an integer location in the block unit. When the intersections are located at the fractional location in the reference lines, the reference candidates at the intersections may be derived by at least two of the neighboring samples neighboring to the reference candidates. For example, the intra prediction unit 22221 may determine a plurality of neighboring locations neighboring to a specific one of the intersections. In the implementation, the neighboring locations are integer locations in the reference lines. Then, the intra prediction unit 22221 may further select the neighboring samples at the neighboring locations, and generate an interpolated value for the reference candidate at the specific intersection based on the selected neighboring samples at the neighboring locations.

In at least one implementation, the intra prediction unit 22221 may use a smoothing filter to smooth the neighboring samples, which are reconstructed prior to the block unit 600, for determining the reference candidates. The intra prediction unit 22221 may determine smoothed values of the neighboring samples at the neighboring locations, and then determine the sample values of the reference candidates based on the smoothed values of the neighboring samples. Thus, the sample values of the reference candidates may be equal to the smoothed values of the neighboring samples, when the reference candidates are located at the integer locations. In additions, the sample values of the reference candidates may be interpolated values generated by interpolating the smoothed values of the neighboring samples, when the reference candidates are located at the fractional locations. In at least one implementation, the sample values of the reference candidates may be directly determined by the neighboring samples without further smoothing the neighboring samples. In at least one implementation, the intra prediction unit 22221 may determine the sample value of the reference candidate 6101 in the reference line 610 based on the smoothed values of the neighboring samples, and determine the sample values of the reference candidates 6111, 6121, and 6131 in the other reference lines 611, 612, and 613 without further filtering the neighboring samples.

In at least one implementation, the intra prediction unit 22221 may determine the selected reference lines for the block unit based on the directional mode without parsing a further syntax element, indicating which of the reference lines are selected, in the bitstream. For example, the intra prediction unit 22221 may compare the reference candidates in one of the reference lines along the orientation with the reference candidates in the other reference lines to generate a first comparison result. Then, the intra prediction unit 22221 may compare the reference candidates in a next one of the reference lines along the orientation with the reference candidates in the other reference lines to generate another first comparison result. Thus, the intra prediction unit 22221 may generate the first comparison results of the reference lines, and compare the first comparison results with each other to determine the selected reference lines of the block unit. In at least one implementation, the intra prediction unit 22221 may use other comparison methods, such as SSE, SAD, SATD, and other cost functions to generate the first comparison results, when the intra prediction unit 22221 compares the reference candidates in one of the reference lines along the orientation with the reference candidates in the other reference lines.

At block 94, the intra prediction unit 22221 generates a smoothed sample based on the reference samples along orientation of the directional mode by using a smooth filter.

In at least one implementation, the intra prediction unit 22221 may determine the reference samples for each of the block elements. In one implementation, the intra prediction unit 22221 may select a specific one of the block elements, and determine the reference samples of the specific block element. In the implementation, the reference samples of the specific block element and the specific block element are located in the same directional line determined by the orientation of the directional mode. The intra prediction unit 22221 may generate the smoothed sample for the specific block element by multiplying the reference samples of the specific block element with at least one predefined weighting parameter. For example, the smoothed sample may be equal to $\Sigma s_i \times r_i$. In the implementation, $r_i$ is the reference sample of the specific block element, and $s_i$ is the predefined weighting parameter. In one implementation, the summation $\Sigma s_i$ of the predefined weighting parameters of the block unit may be equal to one.

In at least one implementation, the intra prediction unit 22221 may determine a plurality of predictor blocks. Each of the predictor blocks is determined based on the reference samples in one of the selected reference lines. For example, the intra prediction unit 22221 may determine a plurality of first reference samples in a first one of the selected reference lines, and determine a plurality of second reference samples in a second one of the selected reference lines, when the number of the selected reference lines is equal to two. In the implementation, the intra prediction unit 22221 may generate a first predictor block having the first reference samples, and a second predictor block having the second reference samples. The intra prediction unit 22221 may generate a smoothed block based on the first predictor block and the second predictor block. In the implementation, the smoothed block includes the smoothed samples generated by smoothing the first reference samples and the second reference samples.

In at least one implementation, the intra prediction unit 22221 may directly smooth the reference samples in the selected reference lines for each of the block elements to generate a smoothed block having the smoothed samples. For example, the intra prediction unit 22221 may generate a first one of the smoothed samples by smoothing the reference samples of a first one of the block elements, and generate other smoothed samples by smoothing the reference samples of each of the other block elements. In the implementation, the smoothed samples of the block elements may be regarded as the smoothed block.

At block 95, the intra prediction unit 22221 sets the smoothed sample as a predicted sample of the block unit.

In at least one implementation, the decoder module 222 may receive a residual block corresponding to the block unit, and generate a plurality of residual samples based on the residual block. Each of the residual samples is corresponding to one of the predicted samples at the element locations of the block unit. The intra prediction unit 22221 may set one of the smoothed samples corresponding to a specific one of the element locations as the predicted sample of the specific element location. Thus, the first summer 2224 of the decoder module 222 in the destination device 12 may add the predicted samples into the residual samples to generate a plurality of reconstructed samples for reconstructing the block unit. In addition, the decoder module 222 may reconstruct all of the other block units in the image frame for reconstructing the image frame and the video.

Figure 10:
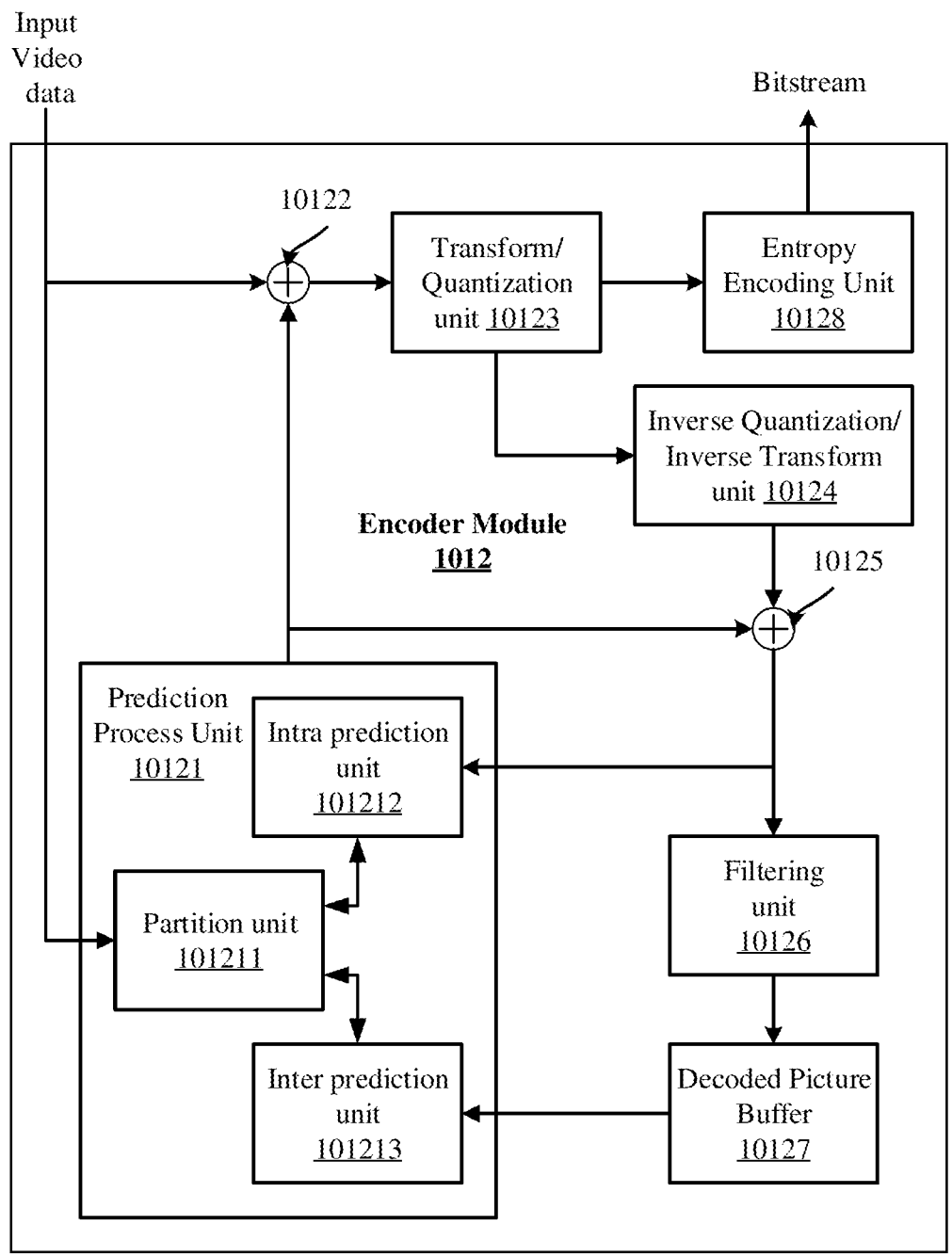
FIG. 10 is a block diagram of an exemplary implementation of the encoder module of the source device in the system of FIG. 1.

FIG. 10 is a block diagram of an encoder module 1012 representing an exemplary implementation of the encoder module 1012 of the source device 11 in the system of FIG. 1. In at least one implementation, the encoder module 1012 includes a prediction process unit 10121, a first summer 10122, a transform/quantization unit 10123, an inverse quantization/inverse transform unit 10124, a second summer 10125, a filtering unit 10126, a decoded picture buffer 10127, and an entropy encoding unit 10128. In at least one implementation, the prediction process unit 10121 of the encoder module 1012 further includes a partition unit 101211, an intra prediction unit 101212, and an inter prediction unit 101213. In at least one implementation, the encoder module 1012 receives the source video, and encodes the source video to output a bitstream.

In at least one implementation, the encoder module 1012 may receive a source video including a plurality of image frames, and then divide the image frames according to a coding structure. In at least one implementation, each of the image frames may be divided into at least one image block. The at least one image block may include a luminance block having a plurality of luminance samples, and at least one chrominance block having a plurality of chrominance samples. The luminance block and the at least one chrominance block may be further divided to generate macroblocks, coding tree units (CTUs), coding blocks (CBs), sub-divisions thereof, and/or another equivalent coding unit. In at least one implementation, the encoder module 1012 may perform additional sub-divisions of the source video. It should be noted that the disclosure described herein are generally applicable to video coding, regardless of how the source video is partitioned prior to and/or during encoding.

In at least one implementation, during the encoding process, the prediction process unit 10121 receives a current image block of a specific one of the image frames. The current image block may be one of the luminance block and the at least one of the chrominance block in the specific image frame. The partition unit 101211 divides the current image block into multiple block units. The intra prediction unit 101212 may perform intra-predictive coding of a current block unit relative to one or more neighboring blocks in the same frame as the current block unit to provide spatial prediction. The inter prediction unit 101213 may perform inter-predictive coding of the current block unit relative to one or more blocks in one or more reference image block to provide temporal prediction.

In at least one implementation, the prediction process unit 10121 may select one of the coding results generated by the intra prediction unit 101212 and the inter prediction unit 101213 based on a mode selection method, such as a cost function. In at least one implementation, the mode selection method may be a rate-distortion optimization (RDO) process. The prediction process unit 10121 determines the selected coding result, and provides a predicted block corresponding to the selected coding result to the first summer 10122 for generating a residual block and to the second summer 10125 for reconstructing the encoded block unit. In at least one implementation, the prediction process unit 10121 may further provide syntax elements, such as motion vectors, intra-mode indicators, partition information, and other syntax information, to the entropy encoding unit 10128.

In at least one implementation, the intra prediction unit 101212 may intra-predict the current block unit. In at least one implementation, the intra prediction unit 101212 may determine an intra-prediction mode directing toward reconstructed sample neighboring to the current block unit to encode the current block unit. In at least one implementation, the intra prediction unit 101212 may encode the current block unit using various intra-prediction modes, and the intra prediction unit 101212 or the prediction process unit 10121 may select an appropriate intra-prediction mode from the tested modes. In at least one implementation, the intra prediction unit 101212 may encode the current block unit using a cross component prediction mode to predict one of the two chroma components of the current block unit based on the luma components of the current block unit. In addition, the intra prediction unit 101212 may predict a first one of the two chroma components of the current block unit based on the other of the two chroma components of the current block unit.

In at least one implementation, the inter prediction unit 101213 may inter-predict the current block unit as an alternative to the intra-prediction performed by the intra prediction unit 101212, as described above. The inter prediction unit 101213 may perform a motion estimation to estimate a motion of the current block unit for generating a motion vector. The motion vector may indicate a displacement of the current block unit within the current image block relative to a reference block unit within a reference image block. In at least one implementation, the inter prediction unit 101213 receives at least one reference image block stored in the decoded picture buffer 10127 and estimates the motion based on the received reference image blocks to generate the motion vector.

In at least one implementation, the first summer 10122 generates the residual block by subtracting the prediction block determined by the prediction process unit 10121 from the original current block unit. The first summer 10122 represents the component or components that perform this subtraction operation.

In at least one implementation, the transform/quantization unit 10123 applies a transform to the residual block to generate a residual transform coefficient, and then quantizes the residual transform coefficients to further reduce bit rate. In at least one implementation, the transform may be DCT, DST, AMT, MDNSST, HyGT, signal dependent transform, KLT, wavelet transform, integer transform, sub-band transform or a conceptually similar transform. In at least one implementation, the transform may convert the residual information from a pixel value domain to a transform domain, such as a frequency domain. In at least one implementation, the degree of quantization may be modified by adjusting a quantization parameter. In at least one implementation, the transform/quantization unit 10123 may perform a scan of the matrix including the quantized transform coefficients. Alternatively, the entropy encoding unit 10128 may perform the scan.

In at least one implementation, the entropy encoding unit 10128 may receive a plurality of syntax elements including quantization parameter, transform data, motion vectors, intra modes, partition information, and other syntax information, from the prediction process unit 10121, and the transform/quantization unit 10123, and encode encodes the syntax elements into the bitstream. In at least one implementation, the entropy encoding unit 10128 entropy encodes the quantized transform coefficients. In at least one implementation, the entropy encoding unit 10128 may perform CAVLC, CABAC, SBAC, PIPE coding or another entropy coding technique to generate an encoded bitstream. In at least one implementation, the encoded bitstream may be transmitted to another device (e.g., the destination device 12) or archived for later transmission or retrieval.

In at least one implementation, the inverse quantization/inverse transform unit 10124 may apply inverse quantization and inverse transformation to reconstruct the residual block in the pixel domain for later use as a reference block. In at least one implementation, the second summer 10125 adds the reconstructed residual block to the prediction block provided from the prediction process unit 10121 to produce a reconstructed block for storage in the decoded picture buffer 10127.

In at least one implementation, the filtering unit 10126 may include a deblocking filter, a SAO filter, a bilateral filter, and/or an ALF to remove blockiness artifacts from the reconstructed block. Additional filters (in loop or post loop) may also be used in addition to the deblocking filter, the SAO filter, the bilateral filter and the ALF. Such filters are not shown for brevity, but if desired, may filter the output of the second summer 10125.

In at least one implementation, the decoded picture buffer 10127 may be a reference picture memory that stores the reference block for use in encoding video by the encoder module 1012, e.g., in intra- or inter-coding modes. The decoded picture buffer 10127 may be formed by any of a variety of memory devices, such as DRAM, including SDRAM, MRAM, RRAM), or other types of memory devices. In at least one implementation, the decoded picture buffer 10127 may be on-chip with other components of the encoder module 1012, or off-chip relative to those components.

In at least one implementation, the encoder module 1012 may perform the multi-reference line prediction method for intra prediction as shown in FIG. 3. The method in FIG. 3 may be carried out using the configuration illustrated in FIG. 1 and FIG. 10, for example, and various elements of these figures are referenced in explaining the example method. Furthermore, the order of blocks in FIG. 3 is illustrative only and may change. Additional blocks may be added or less blocks may be utilized without departing from this disclosure.

At block 31, the encoder module 1012 determines a block unit in an image frame from video data, and determines a plurality of reference lines adjacent to the block unit.

In at least one implementation, the video data may be a video. The source device 11 may receive the video by the source module 111. The encoder module 1012 determines the image frame from the video, and divides the image frame to determine the block unit.

In at least one implementation, the prediction process unit 10121 of the source device 11 determines the block unit from the video via the partition unit 101211, and determines the reference lines adjacent to the block unit. In at least one implementation, number of the reference lines may be greater than two. For example, number of the reference lines is equal to four in FIG. 4. In at least one implementation, each of the reference lines includes a plurality of neighboring samples. Each of the neighboring samples in the reference lines is reconstructed prior to reconstructing the block unit, so the neighboring samples may be a plurality of reference candidates for reconstructing the block unit.

At block 32, the intra prediction unit 101212 determines a directional mode from a plurality of mode candidates for the block unit.

In at least one implementation, the intra prediction unit 101212 may select the directional mode from the mode candidates for predicting the block unit. In at least one implementation, the indices of the mode candidates include 0 to 34 for HEVC, and the indices of the mode candidates include 0 to 66 for versatile video coding (VVC) test model (VTM). In the implementation, the mode candidate may include a DC mode, a planar mode, and a plurality of angle modes. The intra prediction unit 101212 may select one of the angle modes from the mode candidates, and determine the selected angle mode as the directional mode. In the implementation, each of the angle modes has an orientation.

At block 33, the intra prediction unit 101212 selects at least one of the reference lines for the block unit based on the directional mode.

In at least one implementation, the intra prediction unit 101212 may determine a plurality of reference candidates in the reference lines based on the orientation of the directional mode. In the implementation, the intra prediction unit 101212 may compare the reference candidates in a first one of the reference lines with the reference candidates in the other reference lines. Then, the intra prediction unit 101212 may compare the reference candidates in a next one of the reference lines with the reference candidates in the other reference lines until that each of the reference lines has a first comparison result. In the implementation, the intra prediction unit 101212 may further compares the first comparison results of the reference lines to each other. Then, the intra prediction unit 101212 may select the at least one reference line based on a second comparison result between the first comparison results.

At block 34, the intra prediction unit 101212 generates a plurality of predictors for the block unit based on the directional mode and the selected at least one reference line.

In at least one implementation, the block unit may include a plurality of block elements. In the implementation, each of the block elements may be a pixel element. The intra prediction unit 101212 may select, along the orientation, at least one of the reference samples in the selected at least one reference line for each of the block elements. Then, the intra prediction unit 101212 may generate one of the predictors for each of the block elements by multiplying the selected at least one reference sample with at least one predefined weighting parameter.

In at least one implementation, the encoder module 1012 may perform the multi-reference line prediction method for intra prediction as shown in FIG. 5. The method in FIG. 5 may be carried out using the configuration illustrated in FIG. 1 and FIG. 10, for example, and various elements of these figures are referenced in explaining the example method. Furthermore, the order of blocks in FIG. 5 is illustrative only and may change. Additional blocks may be added or less blocks may be utilized without departing from this disclosure.

At block 51, the encoder module 1012 determines a block unit in an image frame from video data, and determines a plurality of reference lines adjacent to the block unit.

In at least one implementation, the video data may be a video. The encoder module 1012 determines the image frame from the video, and divides the image frame to determine the block unit. In at least one implementation, the prediction process unit 10121 of the source device 11 determines the block unit from the video via the partition unit 101211, and determines the reference lines adjacent to the block unit. For example, number of the reference lines is equal to four in FIG. 4. In at least one implementation, each of the reference lines includes a plurality of neighboring samples. Each of the neighboring samples in the reference lines is reconstructed prior to reconstructing the block unit, so the neighboring samples may be a plurality of reference candidates for reconstructing the block unit.

At block 52, the intra prediction unit 101212 determines a directional mode from a plurality of mode candidates for the block unit.

In at least one implementation, the intra prediction unit 101212 may select the directional mode from the mode candidates for predicting the block unit. In the implementation, the mode candidate may include a DC mode, a planar mode, and a plurality of angle modes. The intra prediction unit 101212 may select one of the angle modes from the mode candidates, and determine the selected angle mode as the directional mode. In the implementation, each of the angle modes has an orientation.

At block 531, the intra prediction unit 101212 determines a reference area having a plurality of reference candidates in the reference lines based on an orientation of the directional mode.

In at least one implementation, the intra prediction unit 101212 may determine the reference area based on the orientation. When the orientation 630 is a first direction from the bottom-left to the top-right, the reference area 620 is determined based on the top-left corner and the bottom right corner of the block unit 600 in FIG. 6. In at least one implementation, each of the neighboring samples is located at an integer location in the reference lines.

In at least one implementation, the intra prediction unit 101212 may determine the reference candidates in the reference lines along the orientation. For example, the intra prediction unit 101212 may determine the reference candidates 6101, 6111, 6121, and 6131 in the reference lines 610, 611, 612, and 613 by directing from the block element 6001 toward the reference line 613 along the directional line 631 determined based on the orientation 630. In the implementation, the reference candidates 6101, 6111, 6121, and 6131 in the reference lines 610, 611, 612, and 613, respectively, may be located at fractional locations in the reference lines. In at least one implementation, the intra prediction unit 101212 may select more than one of the neighboring samples neighboring with a specific one of the reference candidates and interpolate the selected neighboring samples to determine a sample value of the specific reference candidate, when the specific reference candidate is located at the fractional location.

In at least one implementation, each of the block elements, the neighboring samples, and the reference candidates may be defined as p (x, y), and the location of the block element at the top-left corner of the block unit 600 may be defined as an origin. In the implementation, the x-coordinate of the block elements in the block unit 600 may be equal to 0, 1, ..., W-2, and W-1, and the y-coordinate of the block elements in the block unit 600 may be equal to 0, 1, ..., H-2, and H-1. In at least one implementation, each of the neighboring samples also may be defined as the i-th reference candidate $r_{i,j}$ in the j-th reference line. In at least one implementation, the orientation may be defined as a parameter intraPredAngle. In the implementation, the parameter intraPredAngle may be defined based on any video coding standard, such as HEVC, and VVC. The parameter intraPredAngle may be left shifted with N bits for N-bit fractional precision.

In at least one implementation, the i-th reference candidate $r_{i,0}$ in the 0-th reference line is identical to the reference candidate p (i, −1), when the orientation of the directional mode is the first direction directed from the bottom-left to the top-right. In order to avoid floating points in hardware implementation, the difference between x-coordinates of the i-th reference candidate $r_{i,0}$ in the 0-th reference line and the i-th reference candidate $r_{i,j}$ in the j-th reference line may be represented by an integer part iIdx=(intraPredAngle×j)>>5 and a fractional part iFact=(intraPredAngle×j) & 31. In at least one implementation, the intra prediction unit 101212 may use a two-tap linear interpolation filter to determine the sample value of the reference candidate. Thus, the i-th reference candidate $r_{i,j}$ in the j-th reference line may be derived by two neighboring samples p (i+iIdx, −1−j) and p (i+iIdx+1, −1−j) in the j-th reference line by the previous-mentioned equation (1). In at least one implementation, the parameter intraPredAngle may be left shifted with 6 bits.

In at least one implementation, the i-th reference candidate $r_{i,0}$ in the 0-th reference line is identical to the reference candidate p (−1, i), when the orientation of the directional mode is a second direction directed from the top-right to the bottom-left. Thus, the difference between y-coordinates of the i-th reference candidate $r_{i,0}$ in the 0-th reference line and the i-th reference candidate $r_j$ in the j-th reference line may be represented by iIdx=(intraPredAngle×j)>>5 and iFact=(intraPredAngle×j) & 31. In at least one implementation, the intra prediction unit 101212 may use a two-tap linear interpolation filter to determine the sample value of the reference candidate. Thus, the i-th reference candidate $r_{i,j}$ in the j-th reference line may be derived by two neighboring samples p (−1−j, i+iIdx) and p (−i−j, i+iIdx+1) in the j-th reference line by the previous-mentioned equation (2). In at least one implementation, the parameter intraPredAngle may be left shifted with 6 bits.

In at least one implementation, the reference candidates in the reference area 860 may be located on the right side of the diagonal line 880 or located below the diagonal line 880 in FIG. 8A, when the orientation of the directional mode is a third direction directed from the bottom-right to the top-left. In the implementation, the location of the reference candidates below the diagonal line 880 may be adjusted to align with the reference candidates located on the right side of the diagonal line 880. Thus, the diagonal line 880 in FIG. 8A may be divided into a plurality of diagonal sub-lines 8800, 8801, 8802, and 8803. When the reference candidates are located on the right side of the diagonal sub-lines 8800, 8801, 8802, and 8803 in FIG. 8B, the reference candidates in the j-th reference line may be respectively determined as p (−1−j, −1−j), p (−j, −1−j), p (−j+1, −1−j), ..., p (W−1+(intraPredAngle×j)>>5, −1−j) and p (W+(intraPredAngle×j)>>5, −1−j). When the reference candidates are located on the left side of the diagonal sub-lines 8800, 8801, 8802, and 8803 in FIG. 8B, the reference candidates in the j-th reference line may be determined as p (−1−j−d, −1−j) derived by the reference candidate p (−1−j, −1−j+d×((213/intraPredAngle)+128)>>8). In at least one implementation, the intra prediction unit 101212 may use a two-tap linear interpolation filter to determine the sample value of the reference candidate. Thus, the i-th reference candidate $r_{i,j}$ in the j-th reference line may be derived according to two neighboring samples p (ibid, −1−j) and p (i+iIdx+1, −1−j) in the j-the reference line by the previous equation (1). In at least one implementation, the location of the reference candidates located on the right side of the diagonal line 880 may be adjusted to align with the reference candidates located below the diagonal line 880. Thus, the i-th reference candidate ri,j in the j-th reference line may be derived according to two neighboring samples p (−1−j, i+iIdx) and p (−i−j, i+iIdx+1) in the j-th reference line by the following equation (2).

In at least one implementation, the intra prediction unit 101212 the intra prediction unit 101212 may use a smoothing filter to filter the neighboring samples, which are reconstructed prior to the block unit 600. The intra prediction unit 101212 may determine filtered values of the neighboring samples in the reference candidates, and then determine the sample values of the reference candidate based on the filtered value of the neighboring samples. In at least one implementation, the sample value of the reference candidate may be directly determined by the neighboring samples without further filtering the neighboring samples. In at least one implementation, the intra prediction unit 101212 may determine the sample value of the reference candidate 6101 in the reference line 610 based on the filtered values of the neighboring samples, and determine the sample values of the reference candidates 6111, 6121, and 6131 in the other reference lines 611, 612, and 613 without further filtering the neighboring samples.

At block 532, the intra prediction unit 101212 compares the reference lines with each other by a comparison between the reference candidates in the reference lines.

In at least one implementation, the intra prediction unit 101212 may select a specific one of the reference lines, and compare each of the reference candidates in the specific reference line with the reference candidates in the other reference lines. In the implementation, the intra prediction unit 101212 compares each of the reference candidates in the specific reference line only with the reference candidates in each of the directional lines to generate a first comparison result of the specific reference line. In the implementation, the intra prediction unit 101212 may further select a next one of the reference lines, and perform the same comparison with the specific reference line to generate the first comparison result of the next reference line. Thus, the intra prediction unit 101212 may generate the first comparison result for each of the reference lines.

In at least one implementation, the comparison between the reference candidates in the reference lines may be performed by computing SAD between the reference candidates in difference reference lines. In at least one implementation, the intra prediction unit 101212 may use other comparison method, such as, SSE, and SATD, and other cost functions to generate the first comparison results.

At block 533, the intra prediction unit 101212 selects at least one of the reference lines based on the comparison result.

In at least one implementation, the intra prediction unit 101212 may compare the first comparison results of the reference lines with each other, and select at least one of the reference lines having the low first comparison results. In one implementation, the intra prediction unit 101212 may select at least one of the reference lines having low SAD values, when the first comparison results are generated by computing SAD.

At block 54, the intra prediction unit 101212 generates a plurality of predictors for the block unit based on the directional mode and the selected at least one reference line.

In at least one implementation, the block unit may include a plurality of block elements. In the implementation, each of the block elements may be a pixel element. The intra prediction unit 101212 may select, along the orientation, at least one of the reference samples in the selected at least one reference line for each of the block elements. Then, the intra prediction unit 101212 may generate one of the predictors for each of the block elements by multiplying the selected at least one reference sample with at least one predefined weighting parameter.

In at least one implementation, the encoder module 1012 may perform the multi-reference lines prediction method for intra prediction as shown in FIG. 9. The method in FIG. 9 may be carried out using the configuration illustrated in FIG. 1 and FIG. 10, for example, and various elements of these figures are referenced in explaining the example method. Furthermore, the order of blocks in FIG. 9 is illustrative only and may change. Additional blocks may be added or less blocks may be utilized without departing from this disclosure.

At block 91, the encoder module 1012 determines a block unit in an image frame from video data, and determines a directional mode from a plurality of mode candidates for the block unit.

In at least one implementation, the video data may be a video. The source device 11 may receive the video by the source module 111. The encoder module 1012 determines the image frame from the video, and divides the image frame to determine the block unit.

In at least one implementation, the intra prediction unit 101212 may select the directional mode from the mode candidates for predicting the block unit. In the implementation, the mode candidate may include a DC mode, a planar mode, and a plurality of angle modes. The intra prediction unit 101212 may select one of the angle modes from the mode candidates, and determine the selected angle mode as the directional mode. In the implementation, each of the angle modes has an orientation.

At block 92, the intra prediction unit 101212 determines a plurality of reference lines adjacent to the block unit.

In at least one implementation, the prediction process unit 10121 of the source device 11 determines the block unit from the video via the partition unit 101211, and determines the reference lines adjacent to the block unit. In at least one implementation, number of the reference lines may be greater than two. In at least one implementation, each of the reference lines includes a plurality of neighboring samples. Each of the neighboring samples in the reference lines is reconstructed prior to reconstructing the block unit, so the neighboring samples may be a plurality of reference candidates for reconstructing the block unit.

At block 93, the intra prediction unit 101212 determines a plurality of reference samples along an orientation of the directional mode based on the neighboring samples in the reference lines.

In at least one implementation, the block unit may include a plurality of block elements. The intra prediction unit 101212 may determine the reference candidates for each of the block elements along the orientation. In the implementation, the reference candidates for each of the block elements are selected from different reference lines. In addition, the intra prediction unit 101212 may select at least one of the reference lines based on the orientation of the directional mode, and then select a plurality of reference samples from the reference candidates in the selected reference lines for each of the block elements.

In at least one implementation, the intra prediction unit 101212 may determine the reference samples in the selected reference lines for each of the block elements, when the intra prediction unit 101212 determines the selected reference lines for the block unit. In at least one implementation, the determined reference samples may be located at integer location or at fractional location in the selected reference lines. In one implementation, a specific one of the determined reference samples may be derived from at least two of the neighboring samples neighboring to the specific determined reference sample, when the specific determined reference sample is located at fractional location. For example, the intra prediction unit 101212 may further select the neighboring samples neighboring to the specific determined reference sample, and generate an interpolated value for the specific determined reference sample based on the selected neighboring samples.

In at least one implementation, the intra prediction unit 101212 may use a smoothing filter to smooth the neighboring samples. The intra prediction unit 101212 may determine smoothed values of the neighboring samples, and then determine the sample values of the reference samples based on the smoothed values of the neighboring samples. In at least one implementation, the sample values of the reference samples may be directly determined by the neighboring samples without further smoothing the neighboring samples. In at least one implementation, the intra prediction unit 101212 may determine the sample value of the reference candidate 6101 in the reference line 610 based on the smoothed values of the neighboring samples, and determine the sample values of the reference candidates 6111, 6121, and 6131 in the other reference lines 611, 612, and 613 without further filtering the neighboring samples.

In at least one implementation, the intra prediction unit 101212 may compare the reference candidates in one of the reference lines along the orientation with the reference candidates in the other reference lines to generate a first comparison result. Then, the intra prediction unit 101212 may generate the first comparison results for each of the reference lines, and compare the first comparison results with each other to determine the selected reference lines of the block unit. In at least one implementation, the intra prediction unit 101212 may use other comparison methods, such as SSE, SAD, SATD, and other cost functions to generate the first comparison results, when the intra prediction unit 101212 compares the reference candidates in one of the reference lines along the orientation with the reference candidates in the other reference lines.

At block 94, the intra prediction unit 101212 generates a smoothed sample based on the reference samples along orientation of the directional mode by using a smooth filter.

In at least one implementation, the intra prediction unit 101212 may determine the reference samples for each of the block elements. In the implementation, a specific one of the block elements and the reference samples corresponding to the specific block element are located in the same directional line determined by the orientation of the directional mode. The intra prediction unit 101212 may generate the smoothed sample for the specific block element by multiplying the reference samples of the specific block element with at least one predefined weighting parameter.

In at least one implementation, the intra prediction unit 101212 may determine a plurality of predictor blocks. Each of the predictor blocks is determined based on the reference samples in one of the selected reference lines. Then, the intra prediction unit 101212 may generate a smoothed block having the smoothed samples generated by smoothing the reference samples in different predictor blocks. In at least one implementation, the intra prediction unit 101212 may directly smooth the reference samples in the selected reference lines for each of the block elements to generate a smoothed block having the smoothed samples.

At block 95, the intra prediction unit 101212 sets the smoothed sample as a predicted sample of the block unit.

In at least one implementation, the intra prediction unit 101212 sets the smoothed sample as a predicted sample of the block unit, when the prediction process unit 10121 selects the smoothed samples to predict the block unit. Then, the encoder module 1012 may generate a plurality of residual samples based on the predicted samples.

In at least one implementation, the intra prediction unit 101212 may also select the other angle modes to generate the predictors for the block unit based on the selected angle mode and the selected at least one reference line corresponding to the selected angle mode, when the intra prediction unit 101212 performs one of the method in FIGS. 3, 5, and 9. In addition, the inter prediction unit 101213 may perform the inter prediction to generate an inter prediction result. In at least one implementation, the prediction process unit 10121 may select one of the prediction results generated from the intra prediction unit 101212 and the inter prediction unit 101213 by using a cost function. For example, the cost function may be a rate-distortion optimization (RDO) cost.

In at least one implementation, the first summer 10122 of the encoder module 1012 in the source device 11 may compare the predictors with a plurality of image samples in the video to generate a plurality of residual samples of the block unit, when the directional mode is selected by the cost function. In addition, the encoder module 1012 may transform and quantize the residual samples to add the transformed and quantized residual coefficients into a bitstream.

In at least one implementation, the intra prediction unit 101212 may further check whether the directional mode is one of the MPMs. When the intra prediction unit 101212 determines that the direction mode is one of the MPMs, the MPM flag may be set to be different from zero and an MPM index corresponding to the directional mode may be added into the bitstream. When the intra prediction unit 101212 determines that the direction mode is different from the MPMs, the MPM flag may be set to be equal to zero and a non-MPM index corresponding to the directional mode may be added into the bitstream.

In at least one implementation, the encoder module 1012 may determine whether the selected at least one reference line is the first reference line 410, and add a pixel line flag into the bitstream based on the determination. When the selected at least one reference line is the first reference line 410, the pixel line flag may be set to be equal to zero. When the selected at least one reference line includes one of the reference lines different from the first reference line 410, the pixel line flag may be set to be different from zero.

In at least one implementation, the destination device 12 may determine the block unit in the image frame, and the reference lines and the directional mode of the block unit, when the destination device 12 decodes another video data (e.g., the bitstream). Thus, the source device 11 and the destination device 12 may determine the same block unit in the same image frame, the same reference lines and the same directional mode, since the partition indications and the prediction indications for determining the block unit and the directional mode generated by the source device 11 are provided to the destination device 12. Since the comparisons performed by the destination device 12 may be identical to the comparisons performed by the source device 11, it is unnecessary for the destination device 12 to parse a flag indicating the selected at least one reference line from the bitstream generated by the source device 11 for providing to the destination device 12. Thus, the intra prediction unit 101212 may determine the selected at least one reference line for the block unit based on the directional mode without signaling a further syntax element into the bitstream.

From the above description, it is manifest that various techniques may be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method of decoding a bitstream by an electronic device, the method comprising:

determining a directional mode of a block unit from the bitstream;

determining a plurality of reference lines neighboring to the block unit, wherein each of the plurality of reference lines includes a plurality of neighboring samples;

determining a block element at an element location of the block unit;

determining, along an orientation of the directional mode, a directional line from the element location;

determining a plurality of intersections between the directional line and the plurality of reference lines for the element location;

determining a plurality of reference samples based on the determined plurality of intersections and the plurality of neighboring samples in at least one of the plurality of reference lines;

generating, based on the plurality of reference samples, a smoothed sample and setting the smoothed sample as a predicted sample at the element location of the block unit;

determining a residual sample at the element location of the block unit from the bitstream; and generating a reconstructed sample at the element location of the block unit based on the residual sample and the predicted sample for reconstructing an image frame including the block unit.

2. The method according to claim 1, wherein the plurality of reference samples correspond to the block element and are determined based on the plurality of intersections between the directional line and the plurality of reference lines, and smoothed by a smooth filter-along the orientation of the directional mode.

3. The method according to claim 1, further comprising:

determining a plurality of neighboring locations neighboring to a specific one of the plurality of intersections;

selecting more than one of the plurality of neighboring samples at the plurality of neighboring locations; and generating an interpolated value for a specific one of the plurality of reference samples on the specific one of the plurality of intersections based on the selected more than one of the plurality of neighboring samples at the plurality of neighboring locations.

4. The method according to claim 3 further comprising:

generating a smoothed value for each of the selected more than one of the plurality of neighboring samples, wherein a specific one of the selected more than one of the plurality of neighboring samples is smoothed based on the plurality of neighboring samples neighboring to the specific one of the selected more than one of the plurality of neighboring samples; and generating the interpolated value for the specific one of the plurality of reference samples on the specific one of the plurality of intersections based on the smoothed values.

5. The method according to claim 1, wherein the directional mode is an intra prediction mode determined for the block unit from the bitstream.

6. An electronic device for decoding a bitstream, the electronic device comprising:

at least one processor; and a storage device coupled to the at least one processor and storing a plurality of instructions which, when executed by the at least one processor, causes the least one processor to:

determine a directional mode of a block unit from the bitstream;

determine a plurality of reference lines neighboring to the block unit, wherein each of the plurality of reference lines includes a plurality of neighboring samples;

determine a block element at an element location of the block unit;

determine, along an orientation of the directional mode, a directional line from the element location;

determine a plurality of intersections between the directional line and the plurality of reference lines for the element location;

determine a plurality of reference samples based on the determined plurality of intersections and the plurality of neighboring samples in at least one of the plurality of reference lines;

generate, based on the plurality of reference samples, a smoothed sample and setting the smoothed sample as a predicted sample at the element location of the block unit;

determine a residual sample at the element location of the block unit from the bitstream; and generate a reconstructed sample at the element location of the block unit based on the residual sample and the predicted sample for reconstructing an image frame including the block unit.

7. The electronic device according to claim 6, wherein the plurality of reference samples correspond to the block element and are located at the plurality of intersections between the directional line and the plurality of reference lines, and smoothed by a smooth filter along the orientation of the directional mode.

8. The electronic device according to claim 6, wherein the plurality of instructions, when executed by the at least one processor, further causes the least one processor to:

determine a plurality of neighboring locations neighboring to a specific one of the plurality of intersections;

select more than one of the plurality of neighboring samples at the plurality of neighboring locations; and generate an interpolated value for a specific one of the plurality of reference samples on the specific one of the plurality of intersections based on the selected more than one of the plurality of neighboring samples at the plurality of neighboring locations.

9. The electronic device according to claim 8, wherein the plurality of instructions, when executed by the at least one processor, further causes the least one processor to:

generate a smoothed value for each of the selected more than one of the plurality of neighboring samples, wherein a specific one of the selected more than one of the plurality of neighboring samples is smoothed based on the plurality of neighboring samples neighboring to the specific one of the selected more than one of the plurality of neighboring samples; and generate the interpolated value for the specific one of the plurality of reference samples on the specific one of the plurality of intersections based on the smoothed values.

10. A method of coding video data by an electronic device, the method comprising:

determining a directional mode of a block unit from the video data, wherein the block unit is divided from an image frame in the video data;

determining a plurality of reference lines neighboring to the block unit, wherein each of the reference lines includes a plurality of neighboring samples;

determining a block element at an element location in the block unit;

determining, along an orientation of the directional mode, a directional line from the element location;

determining a plurality of intersections between the directional line and the plurality of reference lines for the element location;

determining a plurality of reference samples at the plurality of intersections between the directional line and the plurality of reference lines from the neighboring samples in the plurality of reference lines, wherein the plurality of reference samples correspond to the block element and are located in different ones of the plurality of reference lines; and generating, based on the plurality of reference samples, a smoothed sample for predicting the block unit.

11. The method according to claim 10, wherein the video data is a bitstream including the image frame, when the electronic device is a decoder.

12. The method according to claim 10, wherein the video data is a video including the image frame, when the electronic device is an encoder.

13. The method according to claim 12, further comprising:

determining an image sample from the video;

setting the smoothed sample as a predicted sample of the block unit; and generating a residual sample based on the image sample and the predicted sample.

14. The method according to claim 1, wherein the smoothed sample is generated by multiplying the plurality of reference samples by a plurality of weighting values.

15. The electronic device according to claim 6, wherein the smoothed sample is generated by multiplying the plurality of reference samples by a plurality of weighting values.

16. The method according to claim 10, wherein the smoothed sample is generated by multiplying the plurality of reference samples by a plurality of weighting values.

* * * * *